(12) United States Patent
Yuan

(10) Patent No.: US 11,119,347 B2
(45) Date of Patent: Sep. 14, 2021

(54) DISPLAY DEVICE, ELECTRONIC APPARATUS, AND IMAGE ACQUISITION METHOD

(71) Applicant: GUANGDONG OPPO MOBILE TELECOMMUNICATIONS CORP., LTD., Guangdong (CN)

(72) Inventor: Shilin Yuan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/894,043

(22) Filed: Jun. 5, 2020

(65) Prior Publication Data

US 2020/0400986 A1      Dec. 24, 2020

(30) Foreign Application Priority Data

Jun. 24, 2019   (CN) .......................... 201910548891.7

(51) Int. Cl.
*G02F 1/133*       (2006.01)
*G02F 1/1333*     (2006.01)
(Continued)

(52) U.S. Cl.
CPC .... *G02F 1/13338* (2013.01); *G02F 1/133308* (2013.01); *G02F 1/133512* (2013.01); *G06K 9/0004* (2013.01)

(58) Field of Classification Search
CPC .......... G02F 1/13318; G02F 1/133308; G02F 1/13338; G02F 1/133512; G06K 9/0004; G06K 9/22
(Continued)

(56) References Cited

U.S. PATENT DOCUMENTS

2017/0161543 A1    6/2017  Smith et al.
2018/0211085 A1*  7/2018  Liu .................. H01L 27/14678
(Continued)

FOREIGN PATENT DOCUMENTS

CN      106157891 A      11/2016
CN      106412159 A      2/2017
(Continued)

OTHER PUBLICATIONS

International search report from International patent office in a counterpart International patent Application PCT/CN2020/097072, dated Sep. 27, 2020 (9 pages).
(Continued)

*Primary Examiner* — Tony O Davis
(74) *Attorney, Agent, or Firm* — Young Basile Hanlon & MacFarlane, P.C.

(57) ABSTRACT

The present disclosure provides a display device including a display face and a bottom face facing away from each other, wherein between the display face and the bottom face, the display device further includes: a substrate; a photosensitive layer including a plurality of photosensitive units, the plurality of photosensitive units being disposed on the substrate; and a plurality of collimators disposed between the photosensitive layer and the display face, the collimators defining light-passing holes aligned with the photosensitive units, wherein the light-passing holes are capable of allowing light signals to pass through to reach the photosensitive units. The present disclosure further provides an electronic apparatus, and an image acquisition method.

17 Claims, 13 Drawing Sheets

(51) Int. Cl.
　　*G02F 1/1335*　　(2006.01)
　　*G06K 9/00*　　(2006.01)

(58) Field of Classification Search
　　USPC .......................................... 345/156, 690–696
　　See application file for complete search history.

(56) References Cited

U.S. PATENT DOCUMENTS

| | | | |
|---|---|---|---|
| 2018/0247100 A1* | 8/2018 | Zhu | G06K 9/0004 |
| 2018/0366593 A1* | 12/2018 | Huang | H01L 27/14643 |
| 2019/0056613 A1 | 2/2019 | Wang et al. | |
| 2019/0095676 A1 | 3/2019 | Fomani et al. | |
| 2019/0205601 A1* | 7/2019 | Li | G06K 9/0004 |
| 2019/0392190 A1* | 12/2019 | Chen | H01L 27/3234 |
| 2020/0074140 A1* | 3/2020 | Li | G06K 9/0004 |
| 2020/0097696 A1* | 3/2020 | Yao | G06K 9/00906 |
| 2020/0203468 A1* | 6/2020 | Zeng | H01L 27/3262 |
| 2020/0219948 A1* | 7/2020 | Kim | G09G 3/3266 |
| 2020/0293738 A1* | 9/2020 | Zhang | G02F 1/133606 |
| 2020/0293739 A1* | 9/2020 | Yang | H01L 27/3234 |
| 2020/0327296 A1* | 10/2020 | Wu | H01L 27/14621 |
| 2020/0400986 A1* | 12/2020 | Yuan | G02F 1/13338 |

FOREIGN PATENT DOCUMENTS

| | | |
|---|---|---|
| CN | 106773219 A | 5/2017 |
| CN | 106815573 A | 6/2017 |
| CN | 107230698 A | 10/2017 |
| CN | 107368822 A | 11/2017 |
| CN | 109359459 A | 2/2019 |
| CN | 109426022 A | 3/2019 |
| CN | 109633959 A | 4/2019 |
| CN | 109870845 A | 6/2019 |
| CN | 110286717 A | 9/2019 |
| WO | 2018014629 A1 | 1/2018 |

OTHER PUBLICATIONS

European search report from Europe patent office in a counterpart European patent Application 20180861.5, dated Nov. 4, 2020 (7 pages).
Chinese Second Office Action with English Translation for CN Application 201910548891.7 dated Feb. 19, 2021. (23 pages).
Indian First Examination Report for IN Application No. 202014025706 dated May 10, 2021 (5 pages).
Notification to Grant Patent Right with English Translation for Invention Chinese Application No. 201910548891.7, dated Jun. 2, 2021 (9 pages).

\* cited by examiner

DISPLAY DEVICE, ELECTRONIC APPARATUS, AND IMAGE ACQUISITION METHOD

CROSS-REFERENCE TO RELATED APPLICATION(S)

The present application claims priority of Chinese Patent Application No. 201910548891.7, filed on Jun. 24, 2019, the contents of which are herein incorporated by reference in its entirety.

TECHNICAL FIELD

The present disclosure relates to the field of display technology, and more particularly, to a display device, an electronic apparatus, and an image acquisition method.

BACKGROUND

In the art related, a mobile phone may be equipped with a fingerprint identification module operable to identify user's identity, and a display module operable to display images. Currently, there is a manner of configuring the fingerprint identification module to be stacked below the display module, and the user touches a position of the display module corresponding to the fingerprint identification module to input the fingerprint. However, only a very small part in display region of the display module is provided for being touched by the user to make fingerprint identification, and thus, the user experience is rather poor.

SUMMARY

According to an aspect of the present disclosure, the display device includes a display face and a bottom face facing away from each other, wherein between the display face and the bottom face, the display device further includes: a photosensitive layer including a plurality of photosensitive units, the plurality of photosensitive units being disposed on a substrate; and a plurality of collimators disposed between the photosensitive layer and the display face, the collimators defining light-passing holes aligned with the photosensitive units, wherein the light-passing holes are capable of allowing light signals to pass through to reach the photosensitive units.

According to an aspect of the present disclosure, the electronic apparatus includes a casing and the display device above. The display device is mounted on the casing.

According to an aspect of the present disclosure, the image acquisition method is used for a display device, the display device including a display face and a bottom face facing away from each other, wherein between the display face and the bottom face, the display device further includes a photosensitive layer disposed on a substrate, and a collimator defining light-passing holes. The image acquisition method includes: receiving imaging light signals including a target light signal, wherein the target light signal sequentially passes through the display face, the light-passing holes, and reaches the photosensitive layer; and acquiring an image according to the imaging light signals. The imaging light signals refer to all the light signals received by the photosensitive layer, and the target light signal refers to a light signal that, after passing through the light-passing hole, reaches the photosensitive layer.

Additional aspects and advantages of the present disclosure may be illustrated in part in the following description, a part of the additional aspects and advantages may become obvious via the following illustration or may be understood via implementations of the present disclosure.

BRIEF DESCRIPTION OF DRAWINGS

Aspects and advantages of the above-mentioned description and/or any addition aspects and advantages of the present disclosure may be clarified and may be easily understood by referring to the drawings.

Figure 1:
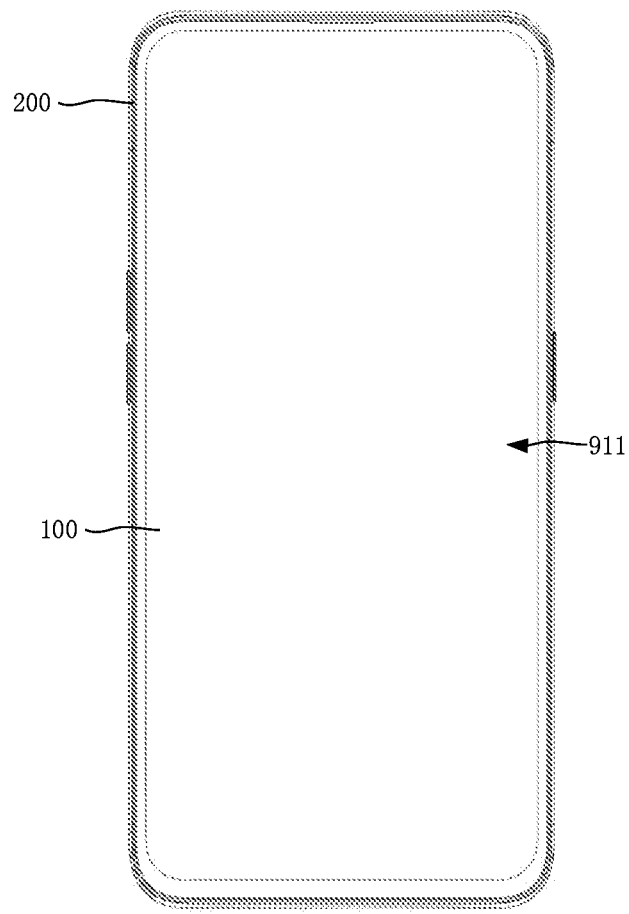
FIG. 1 is a structural diagram of an electronic apparatus according to an embodiment of the present disclosure.

Reference numerals of main components are as follows: Electronic apparatus 1000, display device 100, backlight layer 10, bottom face 11, first polarization layer 20, first substrate 30, photosensitive layer 40, photosensitive unit 41, stray light photosensitive unit 411, noise photosensitive unit 412, infrared photosensitive unit 413, circuit unit 42, photosensitive circuit unit 421, noise circuit unit 422, liquid crystal layer 50, second substrate 60, first face 601, second face 601, display unit 61, light-shielding member 62, light-through hole 621, collimation layer 70, collimator 71, light-passing hole 711, base body 72, light-shielding unit 73, second polarization layer 80, cover plate 90, display face 91, display region 911, back face 92, ink layer 93, casing 200, imaging chip 300, object 2000, display driving layer 1*a*, and display driving unit 1*a*1.

DETAILED DESCRIPTION

Embodiments of the present disclosure are further described below with reference to the accompanying drawings. The same or similar reference numerals in the drawings represent the same or similar elements or elements having the same or similar functions throughout.

In addition, embodiments of the present disclosure described below with reference to the drawings are examples, and are only used to explain the embodiments of the present disclosure, and should not be construed as limiting the present disclosure.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

According to a first aspect of the present disclosure, a display device is provided and includes a display face and a bottom face facing away from each other, wherein between the display face and the bottom face, the display device further includes: a substrate; a photosensitive layer including a plurality of photosensitive units, the plurality of photosensitive units being disposed on the substrate; and a plurality of collimators disposed between the photosensitive layer and the display face, the collimators defining light-passing holes aligned with the photosensitive units, wherein the light-passing holes are capable of allowing light signals to pass through to reach the photosensitive units.

In some embodiments, the display device includes another substrate, a liquid crystal layer, and the substrate that are sequentially stacked, the substrate including a first face facing the display face and a second face facing away from the first face, the plurality of photosensitive units being disposed on the second face, the first face being provided with a plurality of display units and a light-shielding member located between the plurality of display units, the light-shielding member defining light-through holes aligned with the light-passing holes and the photosensitive units.

In some embodiments, the light-shielding member is located between the collimator and the photosensitive unit, an orthographic projection of the plurality of collimators on the substrate being located within the light-shielding member.

In some embodiments, the display device includes another substrate, a liquid crystal layer, and the substrate that are sequentially stacked, the substrate including a first face facing the display face and a second face facing away from the first face, the plurality of photosensitive units being disposed on the first face, the second face being provided with a plurality of display units and a light-shielding member located between the plurality of display units.

In some embodiments, the photosensitive unit is located between the collimator and the light-shielding member, an orthographic projection of the plurality of collimators on the substrate being located within the light-shielding member.

In some embodiments, the display face defines a display region, and an orthographic projection of the plurality of photosensitive units on the display face is located within the display region.

In some embodiments, the collimators are made of light absorbing material, and an extending direction of the light-passing hole is perpendicular to the display face.

In some embodiments, a ratio of a cross-sectional width of the light-passing holes to a depth of the light-passing holes is smaller than 0.2.

In some embodiments, a side of the plurality of photosensitive units facing the bottom face is provided with reflective material.

In some embodiments, the photosensitive units include a stray light photosensitive unit, the display device further including a cover plate on which the display face is formed, the cover plate further including a back face facing away from the display face, the back face being provided with and an ink layer, an orthographic projection of the stray light photosensitive unit on the cover plate being located within the ink layer, the ink layer being configured to block light signals passing from outside into the cover plate.

In some embodiments, the ink layer is provided at a position adjacent to an edge of the back face, and the stray light photosensitive unit is located at an edge position of the photosensitive layer.

In some embodiments, the photosensitive unit include a noise photosensitive unit, and the display device further includes a light-shielding unit disposed on the collimator and configured to shield the light-passing hole aligned with the noise photosensitive unit.

In some embodiments, the photosensitive layer further includes a plurality of circuit units, the circuit units including photosensitive circuit units and noise circuit units, each of the photosensitive units being connected to a corresponding one of the photosensitive circuit units, the noise circuit unit being not connected to the photosensitive unit.

In some embodiments, the plurality of circuit units are arranged in an array of multiple rows and columns, and the noise circuit units are arranged at least in a complete row and a complete column.

In some embodiments, wherein the photosensitive units further include a plurality of infrared photosensitive units configured to detect infrared light.

According to a second aspect of the present disclosure, an electronic apparatus is provided and includes: a casing; and a display device, the display device is mounted on the casing; wherein the display device includes a display face and a bottom face facing away from each other, and wherein between the display face and the bottom face, the display device further includes: a photosensitive layer including a plurality of photosensitive units, the plurality of photosensitive units being disposed on a substrate; and a plurality of collimators disposed between the photosensitive layer and the display face, the collimators defining light-passing holes aligned with the photosensitive units, wherein the light-passing holes are capable of allowing light signals to pass through to reach the photosensitive units.

In some embodiments, the display device includes another substrate, a liquid crystal layer, and the substrate that are sequentially stacked, the substrate including a first face facing the display face and a second face facing away from the first face, the plurality of photosensitive units being disposed on the second face, the first face being provided with a plurality of display units and a light-shielding member located between the plurality of display units, the light-shielding member defining light-through holes aligned with the light-passing holes and aligned with the photosensitive units.

In some embodiments, the display device includes another substrate, a liquid crystal layer, and the substrate that are sequentially stacked, the substrate including a first face facing the display face and a second face facing away from the first face, the plurality of photosensitive units being disposed on the first face, the second face being provided with a plurality of display units and a light-shielding member located between the plurality of display units.

According to a third aspect of the present disclosure, an image acquisition method is provided. The image acquisition method is used for a display device, the display device including a display face and a bottom face facing away from each other, wherein between the display face and the bottom face, the display device further includes a photosensitive layer disposed on a substrate, and a collimator defining light-passing holes; and wherein the image acquisition method includes: receiving imaging light signals including a target light signal, wherein the target light signal sequentially passes through the display face, the light-passing holes, and reaches the photosensitive layer; and acquiring an image according to the imaging light signals; wherein the imaging light signals refer to all the light signals received by the photosensitive layer, and the target light signal refers to a light signal that, after passing through the light-passing hole, reaches the photosensitive layer.

In some embodiments, the image acquisition method further includes: acquiring interference light signals; and acquiring an image according to the imaging light signals and the interference light signals; or the image acquisition method further includes: acquiring noise electrical signals of the photosensitive layer; and acquiring an image according to the imaging light signals and the noise electrical signals; or the image acquisition method further includes: acquiring circuit noise signals of the photosensitive layer; and acquiring an image according to the imaging light signals and the circuit noise signals; or the image acquisition method further includes: acquiring infrared light signals; and acquiring an image according to the imaging light signals and the infrared light signals.

With reference to FIG. 1, an electronic apparatus 1000 according to an embodiment of the present disclosure includes a casing 200 and a display device 100 which is mounted on the casing 200. Specifically, the electronic apparatus 1000 may be a mobile phone, a tablet computer, a display, a notebook computer, a teller machine, a gate, a smart watch, an overhead display, a game machine, smart furniture, or the like. The present disclosure is illustrated with the electronic apparatus 1000 being a mobile phone as an example. It may be understood that specific forms of the electronic apparatus 1000 are not limited to the mobile phone.

The casing 200 may be configured to mount the display device 100, or the casing 200 may serve as a mounting carrier for the display device 100. The casing 200 may also be configured to mount functional modules of the electronic apparatus 1000, such as a power supply device, an imaging device and a communication device, so that the casing 200 provides anti-falling and water-proof protection for the functional modules.

The display device 100 may be configured to display images such as pictures, videos, and texts. The display device 100 is mounted on the casing 200. Specifically, the display device 100 may be mounted on a front face of the casing 200, or the display device 100 may be mounted on a back face of the casing 200, or the display device 100 may be mounted simultaneously on the front face and the back face of the casing 200, or the display device 100 may be mounted on a side face of the casing 200, without any limitation set herein. In the example shown in FIG. 1, the display device 100 is mounted on the front face of the casing 200.

Figure 2:
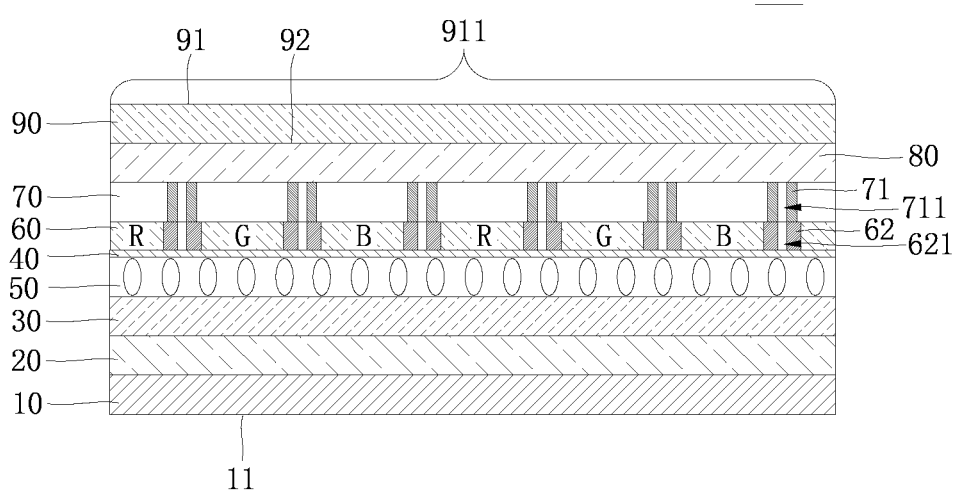
FIG. 2 is a cross-sectional structural diagram of a display device when a photosensitive layer is disposed on a second face according to an embodiment of the present disclosure.
Figure 3:
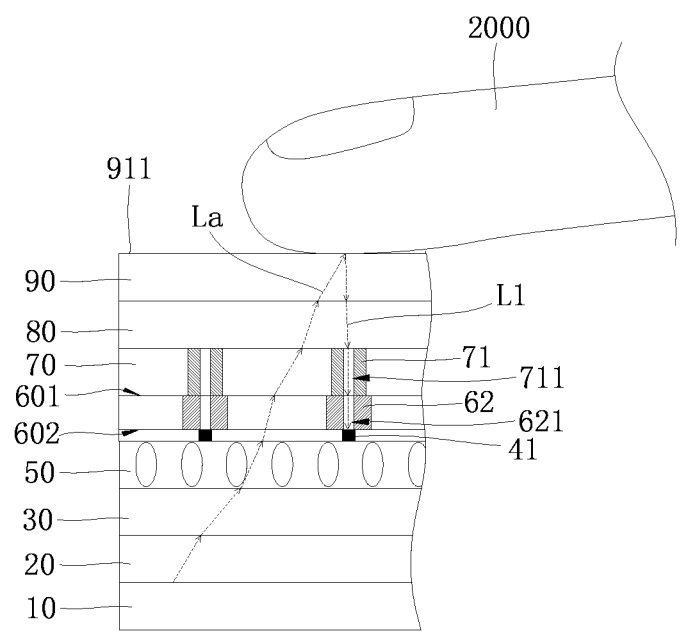
FIG. 3 is a principle diagram showing that a display device is used for fingerprint identification when a photosensitive layer is disposed on a second face according to an embodiment of the present disclosure.
Figure 4:
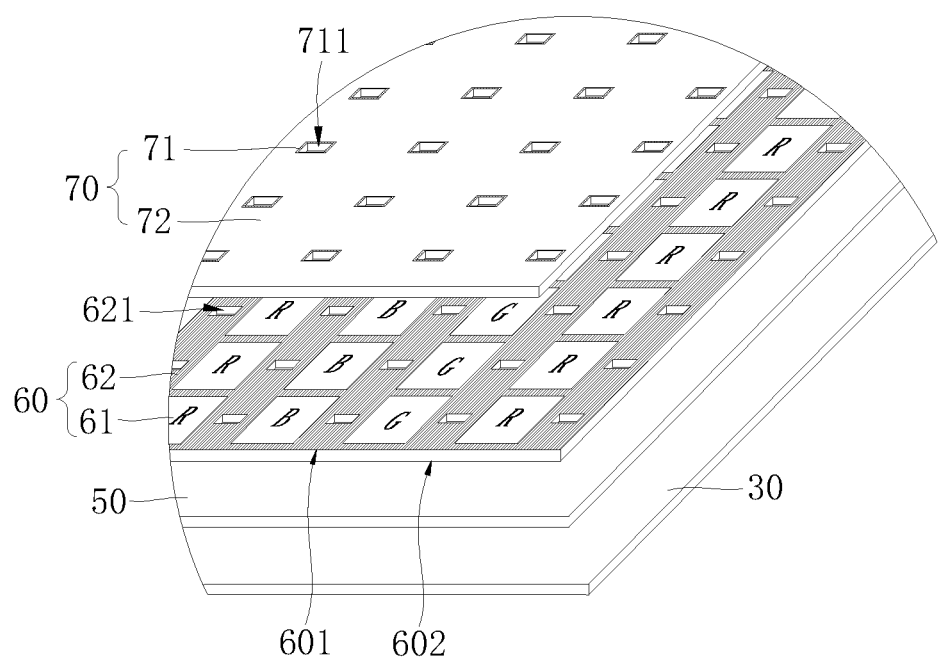
FIG. 4 is a stereo-structural diagram of a display device along a direction from a display face to a bottom face when a photosensitive layer is disposed on a second face according to an embodiment of the present disclosure.

With reference to FIGS. 2 to 4, the display device 100 includes a display face 91 and a bottom face 11 facing away from each other, and between the display face 91 and the bottom face 11, the display device 100 includes a photosensitive layer 40 and a collimator 71. The photosensitive layer 40 includes a plurality of photosensitive units 41 disposed on a second substrate 60. The collimator 71 is disposed between the photosensitive layer 40 and the display face 91. The collimator 71 defines light-passing holes 711 aligned with the photosensitive units 41. The light-passing holes 711 may allow light signals to pass through to reach the photosensitive units 41.

In the electronic apparatus 1000 according to the embodiments of the present disclosure, a plurality of photosensitive units 41, which are disposed on the second substrate 60 of the display device 100 located between the display face 91 and the bottom face 11, may receive light signals entering from the display face 91 and passing through the light-passing holes 711. In light of the light signals, it is possible to acquire images of objects touching the display face 91, which images may be used for fingerprint identification. Meanwhile, according to requirements, a distribution area of the plurality of photosensitive units 41 may be set to account for a larger proportion of the area of the display face 91, such that the user may make fingerprint identification in a larger area of the display face 91, thereby ensuring a better user experience.

Specifically, the display device 100 may make display via light signals emitted by a light-emitting element inside the display device. The display device 100 may also make display by guiding light signals emitted by an external light source. The display device 100 may be inflexible; and the display device 100 may also be bendable, without any limitation set herein.

In an embodiment of the present disclosure, with reference to FIGS. 2 to 5, along a light-emitting direction of the display device 100, the display device 100 includes a backlight layer 10, a first polarization layer 20, a first substrate 30, a liquid crystal layer 50, the photosensitive layer 40, the second substrate 60, a collimation layer 70, a second polarization layer 80, and a cover plate 90 in turns.

As shown in FIGS. 2 and 3, the backlight layer 10 may be configured to emit a light signal La, or the backlight layer 10 may be configured to reflect a light signal La emitted by a light source (not shown). The light signal La passes through the first polarization layer 20, the first substrate 30, the liquid crystal layer 50, the photosensitive layer 40, the second substrate 60, the collimation layer 70, the second polarization layer 80, and the cover plate 90 in turns, before entering the outside. The backlight layer 10 includes a bottom face 11. Specifically, the bottom face 11 may be a face of the backlight layer 10 facing away from the first polarization layer 20.

The first polarization layer 20 is disposed on the backlight layer 10. The first polarization layer 20 may be specifically a polarization sheet or a polarization film. The first substrate 30 is disposed on the first polarization layer 20. The first substrate 30 may be a glass substrate.

Figure 7:
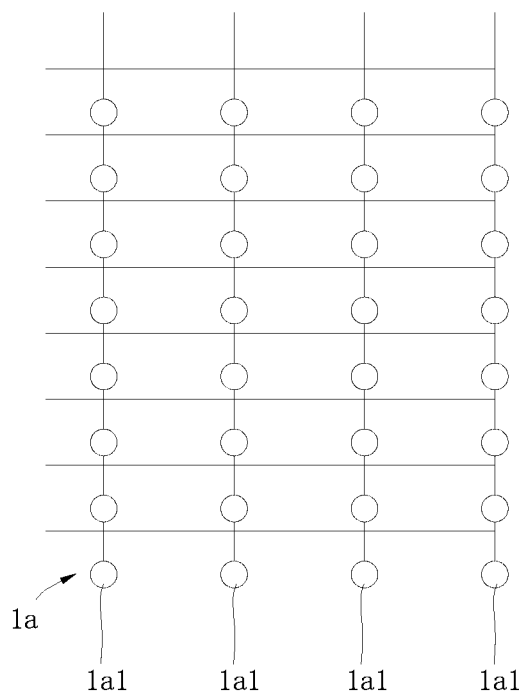
FIG. 7 is a structural diagram of a display driving layer according to an embodiment of the present disclosure.

The liquid crystal layer 50 is disposed on the first substrate 30. Liquid crystal molecules within the liquid crystal layer 50 may change the deflection direction under the action of an electric field, thereby changing the quantity of light signals capable of passing through the liquid crystal layer 50. Correspondingly, in conjunction with FIG. 7, a display driving layer 1a, which may be manufactured on the first substrate 30, may be configured to apply an electric field to the liquid crystal layer 50 to control deflection directions of the liquid crystal molecules at different positions. Specifically, the display driving layer 1a includes a plurality of display driving units 1a1 each of which can independently control the deflection direction of liquid crystal at a corresponding position.

Figure 5:
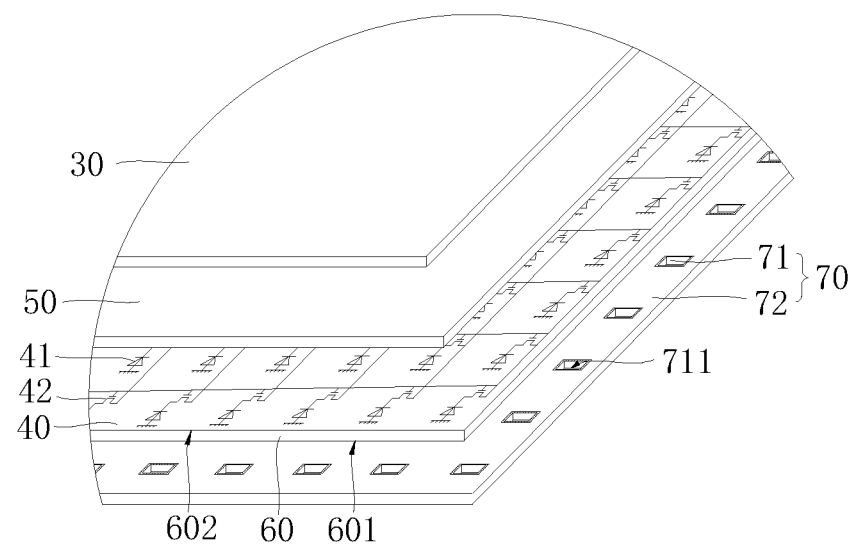
FIG. 5 is a stereo-structural diagram of a display device along a direction from a bottom face to a display face when a photosensitive layer is disposed on a second face according to an embodiment of the present disclosure.
Figure 6:
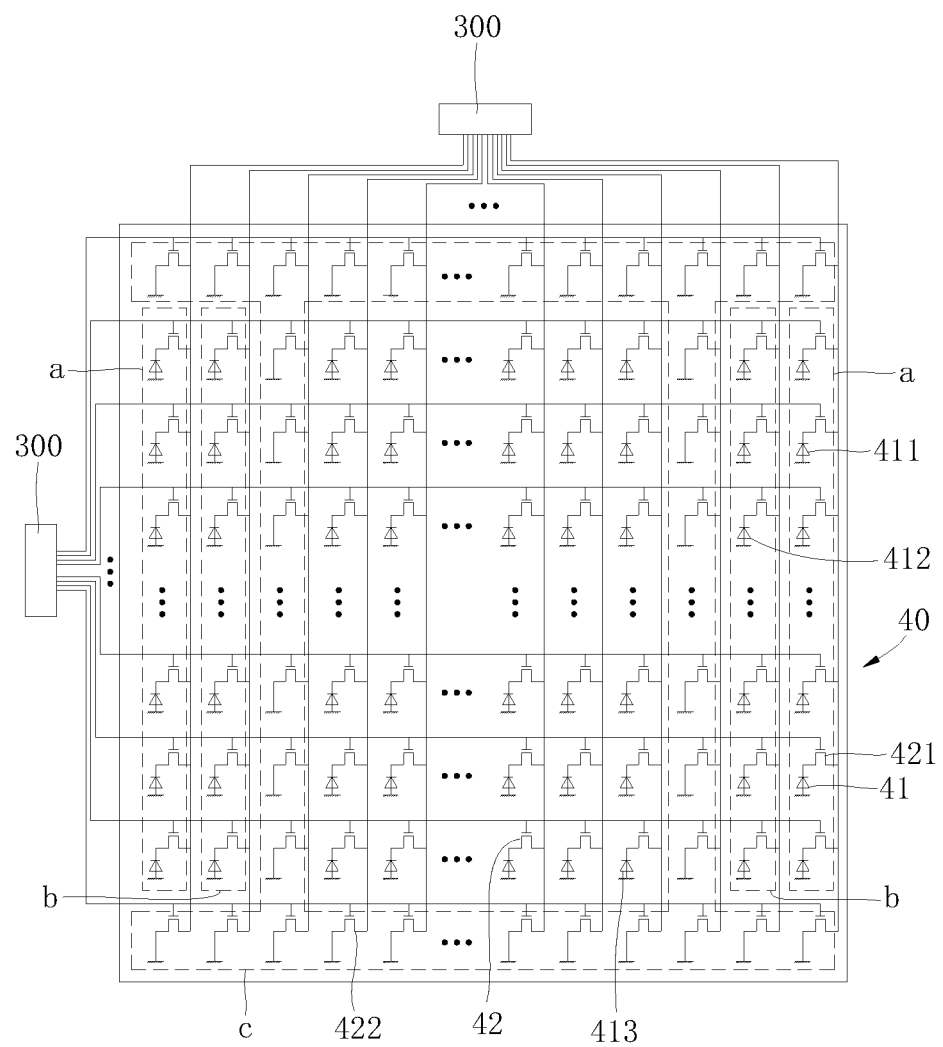
FIG. 6 is a structural diagram of a photosensitive layer and an imaging chip according to an embodiment of the present disclosure.

With reference to FIGS. 2, 4, 5 and 8, the second substrate 60 includes a first face 601 facing the display face 91 and a second face 602 facing away from the first face 601. The photosensitive layer 40 is disposed on the second substrate 60. Specifically, the photosensitive layer 40 may be a film layer disposed on the second face 602 of the second substrate 60. For example, the photosensitive layer 40 is manufactured on the second face 602 of the second substrate 60 via a thin film transistor (TFT) process. With reference to FIGS. 4 to 6, the photosensitive layer 40 includes a plurality of photosensitive units 41 and a plurality of circuit units 42.

The photosensitive units 41 may convert received light signals into electrical signals by use of a photoelectric effect. By analyzing intensity of the electrical signals generated by the photosensitive units 41, it is possible to reflect the intensity of the light signals received by the photosensitive units 41. In one example, the photosensitive units 41 may merely receive visible light signals to be converted into electrical signals. In another example, the photosensitive units 41 may merely receive invisible light to be converted into electrical signals. In still another example, the photosensitive units 41 may receive visible and invisible light to be converted into electrical signals. Types of the plurality of photosensitive units 41 may be the same, and may also be not completely the same. The plurality of photosensitive units 41 may be arranged in an arbitrary manner. The arrangement manner of the plurality of photosensitive units 41 may be specifically set according to requirements for the appearance and the like of the display device 100. In an embodiment of the present disclosure, the plurality of photosensitive units 41 are arranged in an array. For example, the plurality of photosensitive units 41 are arranged in a matrix of multiple rows and columns. Each of the photosensitive units 41 may work independently without being affected by other photosensitive units 41. The intensity of the light signals received by the photosensitive units 41 at different positions may differ, so the intensity of the electrical signals generated by the photosensitive units 41 at different positions may also differ. In addition, reflective material may be provided on a side of the photosensitive unit 41 facing the bottom face 11, and may reflect light signals irradiated from the backlight layer 10 onto the photosensitive unit 41, to avoid this part of light signals from affecting accuracy of imaging of the photosensitive layer 40.

The circuit units 42 may be connected to the photosensitive units 41. The circuit units 42 may transmit the electrical signal generated by the photosensitive units 41 to an imaging chip 300 of the electronic apparatus 1000. The circuit units 42 may specifically include elements such as a transistor. The circuit units 42 may be plural in number, and each of the photosensitive units 41 may be connected to a corresponding one of the circuit units 42. The plurality of circuit units 42 are connected to the imaging chip 300 via a connection line. The arrangement manner of the plurality of circuit units 42 may be similar to that of the photosensitive units 41. For example, the plurality of photosensitive units 41 are arranged in a matrix of multiple rows and columns, and the plurality of circuit units 42 may also be arranged in a matrix of multiple rows and columns.

With reference to FIGS. 2, 4, 5 and 8, the second substrate 60 is disposed on the liquid crystal layer 50. The second substrate 60 may include a glass substrate, and a plurality of display units 61 and a light-shielding member 62 disposed on the glass substrate. The display units 61 may be color filters, for example, R represents an infrared filter, G represents a green filter, and B represents a blue filter. The quantity of light signals passing through filters of different colors is controlled so as to control the color finally displayed by the display device 100. The arrangement manner of the plurality of display units 61 may correspond to the arrangement manner of the plurality of display driving units 1a1. For example, one display unit 61 is aligned with one display driving unit 1a1.

The light-shielding member 62, which is located between the display units 61, spaces two adjacent display units 61 apart. In one example, the light-shielding member 62 may be a black matrix (BM). An entity part of the light-shielding member 62 may prevent light rays from passing, so as to avoid light rays within the display device 100 from entering the outside without passing through the display units 61. The light-shielding member 62 may also prevent occurrence of crosstalk when light signals pass through adjacent display units 61.

Figure 8:
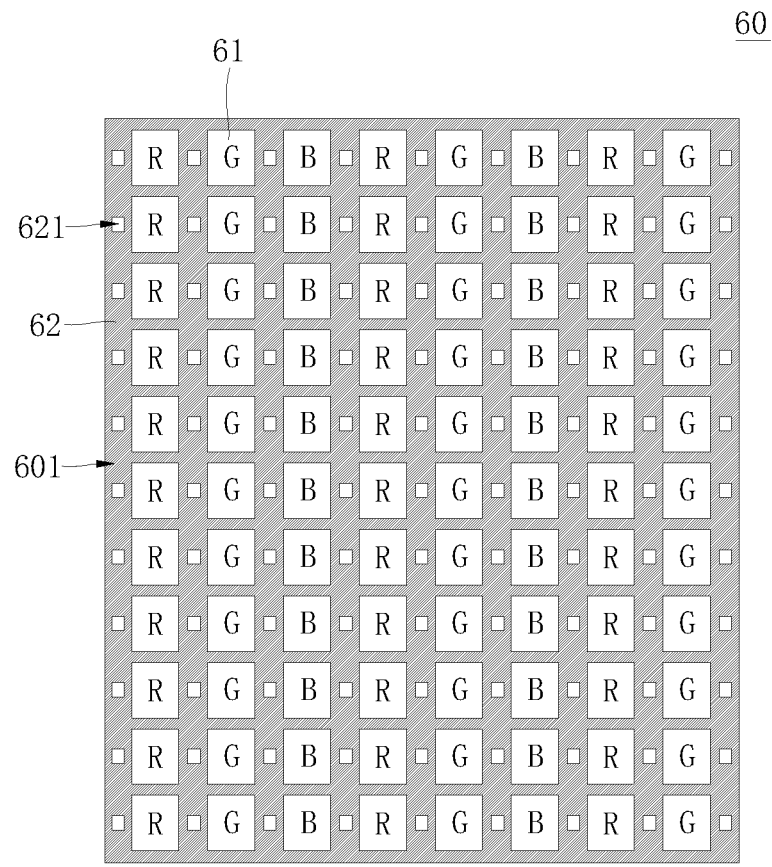
FIG. 8 is a diagram of a planar structure of a second substrate when a photosensitive layer is disposed on a second face according to an embodiment of the present disclosure.

With reference to FIGS. 3 to 5, the light-shielding member 62 defines light-through holes 621 which may be provided for light signals to pass through. The position of the light-through holes 621 is aligned with the photosensitive unit 41. Alignment may mean that a center line of the light-through holes 621 passes through the photosensitive unit 41. In the process where the light signals pass through the light-through holes 621, if the light signals reach an inner wall of the light-through holes 621, the light signals will be partially or completely absorbed by the inner wall of the light-through holes 621, so that a propagation direction of the light signals capable of passing through the light-through holes 621 almost coincides with an extending direction of the center line of the light-through holes 621. A distribution manner of the light-through holes 621 may be the same as that of the photosensitive units 41, so that each of the photosensitive units 41 is aligned with one of the light-through holes 621. As shown in FIG. 8, when the light-shielding member 62 defines a plurality of light-through holes 621, the plurality of light-through holes 621 are located in a vertical column of the light-shielding member 62, and the light-through hole 621 lying in a non-edge position is located between two adjacent display units 61 of different colors, such as between R and G, between G and B, between B and R, and so on. At this time, a width of the vertical column of the light-shielding member may be 15 mm to 40 mm, for example, the width is 15 mm, 18 mm, 20 mm, 34.5 mm, 40 mm, or the like. In other embodiments, when the light-shielding member 62 defines a plurality of light-through holes 621, the plurality of light-through holes 621 may also be located in a horizontal row of the light-shielding member 62, and the light-through hole 621 lying in a non-edge position is located between two adjacent display units 61 of a same color, such as between R and R, between G and G, between B and B, and so on. At this time, a width of the horizontal row of the light-shielding member may be 12.5 mm to 15 mm, for example, the width is 12.5 mm, 13 mm, 13.8 mm, 14 mm, 15 mm, or the like.

With reference to FIGS. 2 to 5, the collimation layer 70 is disposed on the second substrate 60. The collimation layer 70 includes a plurality of collimators 71. The collimators 71 define light-passing holes 711 aligned with the photosensitive units 41. Specifically, the light-passing holes 711 may also be aligned with the light-through holes 621, that is, the center line of the light-passing hole 711 may coincide with the center line of the light-through hole 621; and the light signals pass through the light-passing holes 711 and then through the light-through holes 621 to reach the photosensitive units 41. The material of the collimator 71 may be the same as that of the light-shielding member 62. For example, both the collimator 71 and the light-shielding member 62 are made of light-absorbing material. When the light signals reach the entity part of the collimator 71, the light signals will be partially or completely absorbed. For example, when the light signals reach a side wall of the collimator 71 or the light signals reach an inner wall of the light-passing hole 711, the light signals are absorbed by the collimator 71, so that the light signals whose propagation direction coincides with the extending direction of the center line of the light-passing hole 711 may pass through the light-passing hole 711 and reach the photosensitive units 41 to realize collimation of the light signals, and thus interference light signals received by the photosensitive units 41 are fewer. An orthographic projection of the plurality of collimators 71 on the second substrate 60 may be located within the light-shielding member 62, so that the collimators 71 do not block the display units 61, thereby ensuring that the display device 100 has a better display effect.

The extending direction of the light-passing holes 711 may be perpendicular to the display face 91, so that the light-passing holes 711 only allow passage of light signals whose propagation direction is perpendicular to the display face 91, or the light-passing holes 711 only allow passage of light signals propagating perpendicularly downward from the display face 91. The ratio of a cross-sectional width of the light-passing hole 711 to a depth of the light-passing hole 711 is smaller than 0.2. Therein, the depth of the light-passing hole 711 may be a depth of the light-passing hole 711 along the direction of the center line. The cross-sectional width of the light-passing hole 711 may be a maximum cross-sectional size of a pattern of the light-passing hole 711 cut by a plane perpendicular to the center line. The ratio may be specifically a value such as 0.1, 0.111, 0.125, 0.19, 0.195, 0.199, or the like, so that the collimator 71 has a better effect of collimating the light signals.

In one example, the collimation layer 70 further includes a base body 72. The base body 72 may be substantially light-transmissive, and the collimator 71 is formed on the base body 72. In another example, the collimation layer 70 may merely include the collimator 71 which may be formed on the second substrate 60 in a manner, for example, filming or sputtering.

A second polarization layer 80 is disposed on the collimation layer 70. The second polarization layer 80 may be specifically a polarization sheet or a polarization film.

With reference to FIGS. 2 and 3 again, the cover plate 90 is disposed on the second polarization layer 80. The cover plate 90 may be made of glass, sapphire, or the like. The cover plate 90 includes a display face 91 and a back face 92. The light signals emitted by the display device 100 pass through the display face 91, before entering the outside, and the light rays from the outside pass through the display face 91, before entering the display device 100. The back face 92 may be attached to the second polarization layer 80. In some examples, the display device 100 also may not include the cover plate 90. At this time, the display face 91 is formed on the second polarization layer 80.

The display face 91 defines display region 911. The display region 911 refers to a region that can be used for displaying images. The display region 911 may be rectangular, circular, rounded rectangular, rectangular with "bangs", or the like, without any limitation set herein. In addition, in some examples, the display face 91 may also define non-display region. The non-display region may be formed at a peripheral position of the display region 911, and the non-display region may be configured for connection with the casing 200. A proportion of the display region 911 on the display face 91 may be any value such as 80%, 90%, or 100%.

In an embodiment of the present disclosure, the orthographic projection of the plurality of photosensitive units 41 on the display face 91 is located within the display region 911, so that the plurality of photosensitive units 41 may image objects touching the display region 911. With a user's use of a finger to touch the display region 911 as an example, the plurality of photosensitive units 41 may image the fingerprint of the finger touching the display region 911 to make fingerprint identification.

With further reference to FIG. 2 and FIG. 3, specific details of imaging performed by the display device 100 according to the embodiments of the present disclosure will be described with examples below. The light signal La emitted by the display device 100 passes through the first polarization layer 20, the first substrate 30, and the liquid crystal layer 50, the photosensitive layer 40, the second substrate 60, the collimation layer 70, the second polarization layer 80, and the cover plate 90 in turns, before entering the outside. A light signal from the outside may also pass through the cover plate 90, the second polarization layer 80, the collimation layer 70 and the second substrate 60 in turns, before reaching the photosensitive layer 40. If the light signal just reaches the photosensitive unit 41 in the photosensitive layer 40, the photosensitive unit 41 will generate an electrical signal to reflect intensity of the light signal.

Therefore, intensity of the electrical signals of the plurality of photosensitive units 41 may reflect intensity distribution of the light signals entering the display device 100.

Take the user's touching the display face 91 with a finger 2000 as an example. When the display device 100 is emitting a light signal La outward, the finger 2000 touches a predetermined position of the display face 91. The finger 2000 may reflect the light signal La to form L1. The light signal L1 then starts to enter the display device 100. The light signal L1 first passes through the cover plate 90 and the second polarization layer 80. The light signal L1, whose propagation direction is the same as the extending direction of the light-passing hole 711 and the light-through hole 621, may also pass through the light-passing hole 711 and the light-through hole 621. After passing through the light-passing hole 711 and the light-through hole 621, the light signal L1 reaches the photosensitive unit 41. After a light signal, whose propagation direction is different from the extending direction of the light-passing hole 711 or the light-through hole 621, passes through the cover plate 90 and the second polarization layer 80, the light signal cannot pass through the light-passing hole 711 or the light-through hole 621, and thereby cannot reach the photosensitive unit 41 aligned with the light-passing hole 711 and the light-through hole 621.

It may be understood that, there are peaks and valleys in the fingerprint of a finger. When the finger 2000 touches the display face 91, the peaks directly contact the display face 91. There is a gap between the valleys and the display face 91. After the light signal La reaches the peaks and valleys, intensity of light signals (hereinafter referred to as first light signals) reflected by the peaks and intensity of light signals (hereinafter referred to as second light signals) reflected by the valleys differ, so that due to a difference between intensity of electrical signals (hereinafter referred to as first electrical signals) generated by receiving the first light signals and intensity of electrical signals (hereinafter referred to as second electrical signals) generated by receiving the second light signals, the imaging chip 300 may obtain an image of the fingerprint according to distribution conditions of the first electrical signals and the second electrical signals. The image of the fingerprint may be further configured to make fingerprint identification.

It may be understood that, the user may achieve the purpose of imaging and identifying the fingerprint by touching above any region where the photosensitive units 41 are provided. When the photosensitive units 41 are correspondingly provided below the display region 911, the user may achieve the purpose of imaging and identifying the fingerprint by touching any position in the display region 911, not limited to some particular positions of the display region 911. Meanwhile, the user may also simultaneously touch multiple positions on the display region 911 with multiple fingers, or multiple users may simultaneously touch multiple positions on the display region 911 with multiple fingers to achieve the purpose of imaging and identifying multiple fingerprints. As such, it is possible to enrich verification manners and applicable scenarios of the electronic apparatus 1000. For example, only when multiple fingerprints are simultaneously verified, multiple users may be authorized to perform operations such as games on the same electronic apparatus 1000.

Of course, similar to the case that the user touches the display face 91 with a finger, after any object (e.g., the user's arm, forehead, clothes, flowers, etc.) capable of reflecting the light signal La touches the display face 91, it is possible to image face texture of the object. Subsequent processing performed for the imaging can be set according to user's needs, without any limitation set herein.

With reference to FIGS. 9 to 12, in some embodiments, along a light-emitting direction of the display device 100, the display device 100 includes a backlight layer 10, a first polarization layer 20, a first substrate 30, a liquid crystal layer 50, a second substrate 60, a photosensitive layer 40, a collimation layer 70, a second polarization layer 80, and a cover plate 90 in turns.

The backlight layer 10 may be configured to emit a light signal La, or the backlight layer 10 may be configured to reflect a light signal La emitted by a light source (not shown). The light signal La passes through the first polarization layer 20, the first substrate 30, the liquid crystal layer 50, the second substrate 60, the photosensitive layer 40, the collimation layer 70, the second polarization layer 80, and the cover plate 90 in turns, before entering the outside. The backlight layer 10 includes a bottom face 11. Specifically, the bottom face 11 may be a face of the backlight layer 10 facing away from the first polarization layer 20.

The first polarization layer 20 is disposed on the backlight layer 10. The first polarization layer 20 may be specifically a polarization sheet or a polarization film. The first substrate 30 is disposed on the first polarization layer 20. The first substrate 30 may be a glass substrate.

The liquid crystal layer 50 is disposed on the first substrate 30. Liquid crystal molecules within the liquid crystal layer 50 may change the deflection direction under the action of an electric field, thereby changing the quantity of light signals capable of passing through the liquid crystal layer 50. Correspondingly, in conjunction with FIG. 7, a display driving layer 1a, which may be manufactured on the first substrate 30, may be configured to apply an electric field to the liquid crystal layer 50 to control deflection directions of the liquid crystal molecules at different positions. Specifically, the display driving layer 1a includes a plurality of display driving units 1a1 each of which may independently control the deflection direction of liquid crystal at a corresponding position.

With reference to FIGS. 9, 11, 12 and 13, the second substrate 60 is disposed on the liquid crystal layer 50. The second substrate 60 includes a first face 601 facing the display face 91 and a second face 602 facing away from the first face 601. When the second substrate 60 is disposed on the liquid crystal layer 50, the second face 602 is in contact with the liquid crystal layer 50. The second substrate 60 may also include a glass substrate, and a plurality of display units 61 and a light-shielding member 62 disposed on the glass substrate. The display units 61 may be color filters, for example, R represents an infrared filter, G represents a green filter, and B represents a blue filter. The quantity of light signals passing through filters of different colors is controlled so as to control the color finally displayed by the display device 100. The arrangement manner of the plurality of display units 61 may correspond to the arrangement manner of the plurality of display driving units 1a1. For example, one display unit 61 is aligned with one display driving unit 1a1.

The light-shielding member 62, which is located between the display units 61, spaces two adjacent display units 61 apart. In one example, the light-shielding member 62 may be a black matrix (BM). An entity part of the light-shielding member 62 may prevent light rays from passing, so as to avoid light rays within the display device 100 from entering the outside without passing through the display units 61. The light-shielding member 62 may also prevent occurrence of crosstalk when light signals pass through adjacent display units 61.

Figure 11:
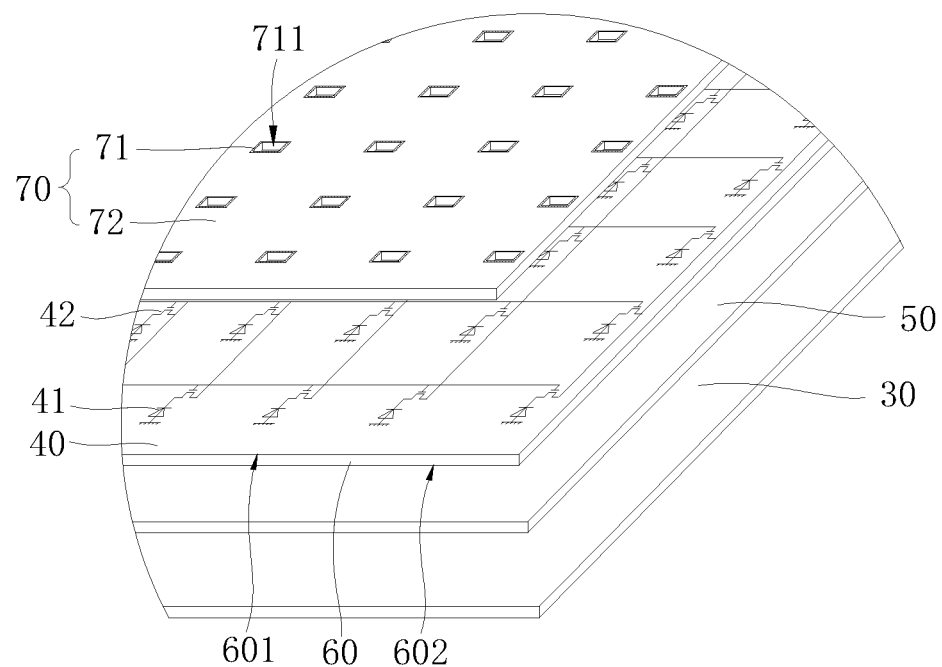
FIG. 11 is a stereo-structural diagram of a display device along a direction from a display face to a bottom face when a photosensitive layer is disposed on a first face according to an embodiment of the present disclosure.
Figure 12:
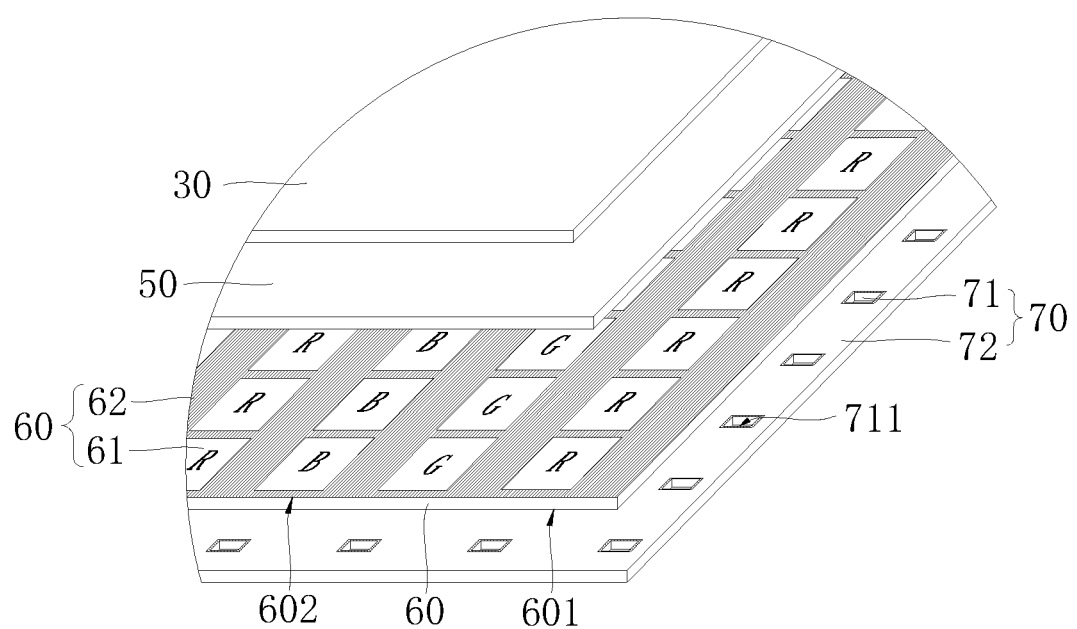
FIG. 12 is a stereo-structural diagram of a display device along a direction from a bottom face to a display face when a photosensitive layer is disposed on a first face according to an embodiment of the present disclosure.
Figure 13:
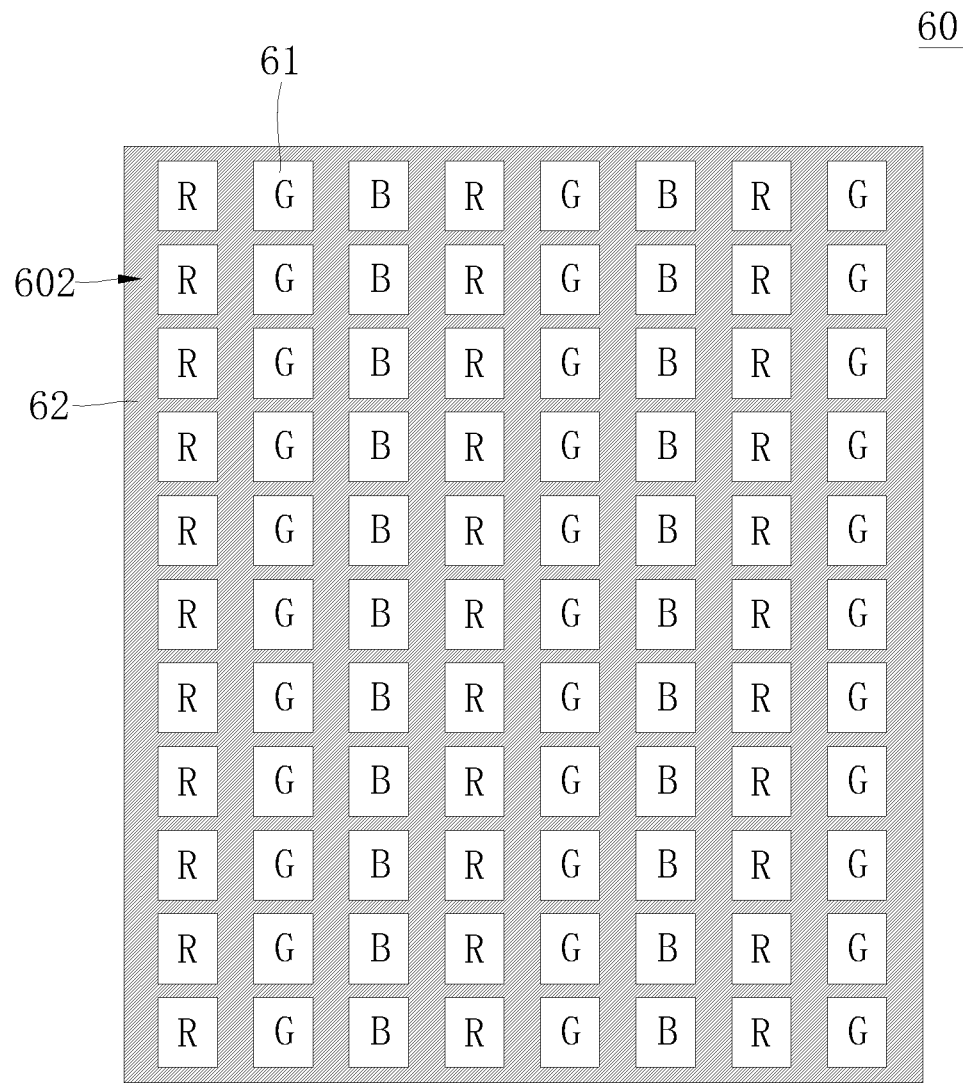
FIG. 13 is a diagram of a planar structure of a second substrate when a photosensitive layer is disposed on a first face according to an embodiment of the present disclosure.

The photosensitive layer 40 is disposed on the second substrate 60. Specifically, the photosensitive layer 40 may be a film layer disposed on the first face 601 of the second substrate 60. For example, the photosensitive layer 40 is manufactured on the first face 601 of the second substrate 60 via a thin film transistor (TFT) process. With reference to FIGS. 6, 11 and 12, the photosensitive layer 40 includes a plurality of photosensitive units 41 and a plurality of circuit units 42. The functions and arrangements of a plurality of photosensitive units 41 and a plurality of circuit units 42 disposed on the first face 601 are the same as those of a plurality of photosensitive units 41 and a plurality of circuit units 42 disposed on the second face 602, and are omitted herein.

With reference to FIGS. 9 to 12, the collimation layer 70 is disposed on the photosensitive layer 40. The collimation layer 70 includes a plurality of collimators 71. The collimators 71 define light-passing holes 711 aligned with the photosensitive units 41. The light signals pass through the light-passing holes 711 and then may reach the photosensitive units 41. The material of the collimator 71 may be the same as that of the light-shielding member 62. For example, both the collimator 71 and the light-shielding member 62 are made of light-absorbing material. When the light signals reach the entity part of the collimator 71, the light signals will be partially or completely absorbed. For example, when the light signals reach a side wall of the collimator 71 or the light signals reach an inner wall of the light-passing hole 711, the light signals are absorbed by the collimator 71, so that the light signals whose propagation direction coincides with the extending direction of the center line of the light-passing hole 711 may pass through the light-passing hole 711 and reach the photosensitive units 41 to realize collimation of the light signals, and thus interference light signals received by the photosensitive units 41 are fewer. An orthographic projection of the plurality of collimators 71 on the second substrate 60 may be located in the light-shielding member 62, so that the collimators 71 do not block the display units 61, thereby ensuring that the display device 100 has a better display effect. As shown in FIG. 12, projections of the plurality of collimators 71 on the second substrate 60 are located within a vertical column of the light-shielding member 62. At this time, a width of the vertical column of the light-shielding member 62 may be 15 mm to 40 mm. In other embodiments, projections of the plurality of collimators 71 on the second substrate 60 may also be located within a horizontal row of the light-shielding member 62. At this time, a width of the horizontal row of the light-shielding member 62 may be 12.5 mm to 15 mm.

The extending direction of the light-passing holes 711 may be perpendicular to the display face 91, so that the light-passing holes 711 only allow passage of light signals whose propagation direction is perpendicular to the display face 91, or the light-passing holes 711 only allow passage of light signals propagating perpendicularly downward from the display face 91. The ratio of a cross-sectional width of the light-passing hole 711 to a depth of the light-passing hole 711 is smaller than 0.2. Therein, the depth of the light-passing hole 711 may be a depth of the light-passing hole 711 along the direction of the center line. The cross-sectional width of the light-passing hole 711 may be a maximum cross-sectional size of a pattern of the light-passing hole 711 cut by a plane perpendicular to the center line. The ratio may be specifically a value such as 0.1, 0.111, 0.125, 0.19, 0.195, 0.199, or the like, so that the collimator 71 has a better effect of collimating the light signals.

The collimation layer 70 further includes a base body 72. The base body 72 may be substantially light-transmissive, and the collimator 71 is formed on the base body 72.

A second polarization layer 80 is disposed on the collimation layer 70. The second polarization layer 80 may be specifically a polarization sheet or a polarization film.

Figure 9:
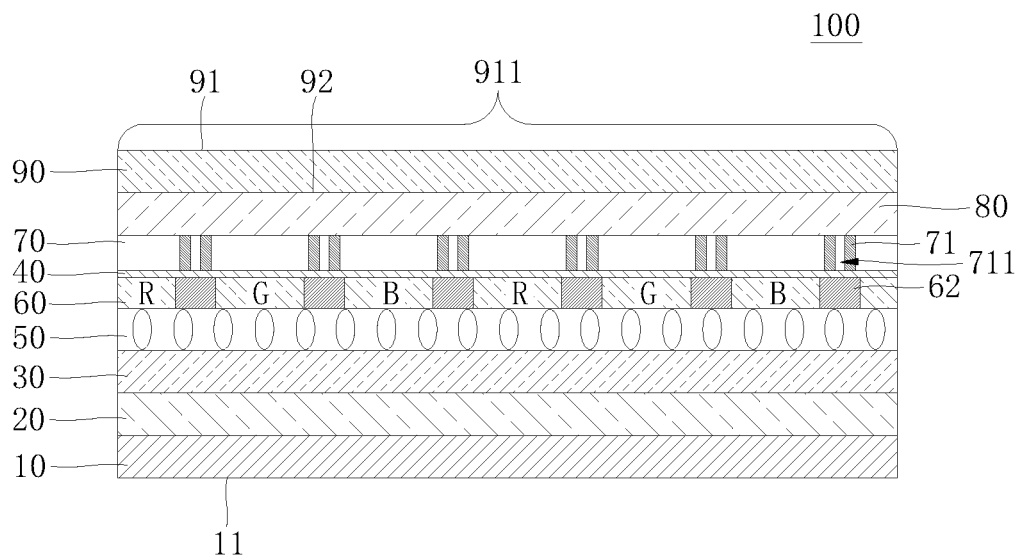
FIG. 9 is a cross-sectional structural diagram of a display device when a photosensitive layer is disposed on a first face according to an embodiment of the present disclosure.
Figure 10:
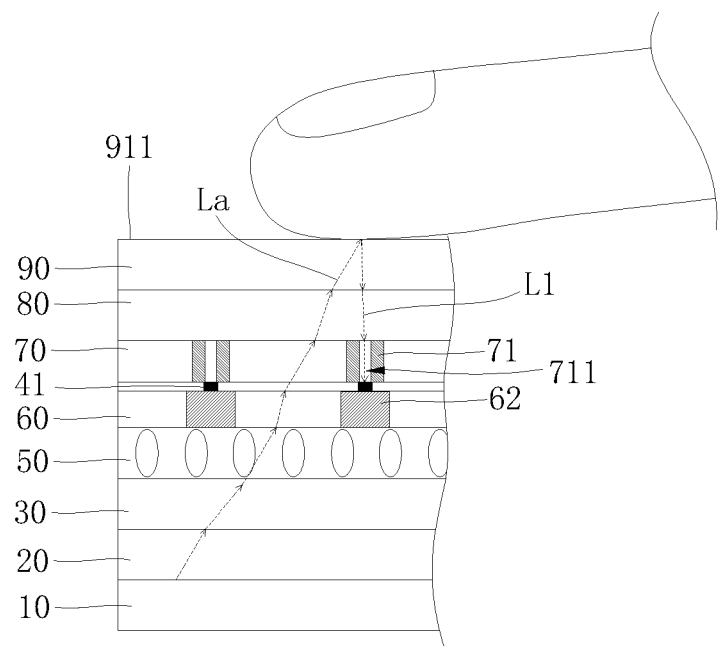
FIG. 10 is a principle diagram showing that a display device is used for fingerprint identification when a photosensitive layer is disposed on a first face according to an embodiment of the present disclosure.

With reference to FIGS. 9 and 10, the cover plate 90 is disposed on the second polarization layer 80. The cover plate 90 may be made of glass, sapphire, or the like. The cover plate 90 includes a display face 91 and a back face 92. The light signals emitted by the display device 100 pass through the display face 91, before entering the outside, and the light rays from the outside pass through the display face 91, before entering the display device 100. The back face 92 may be attached to the second polarization layer 80. In some examples, the display device 100 may also not include the cover plate 90. At this time, the display face 91 is formed on the second polarization layer 80.

The display face 91 defines a display region 911. The display region 911 refers to a region that can be used for displaying images. The display region 911 may be rectangular, circular, rounded rectangular, rectangular with "bangs", or the like, without any limitation set herein. In addition, in some examples, the display face 91 may also define non-display region. The non-display region may be formed at a peripheral position of the display region 911, and may be configured for connection with the casing 200. A proportion of the display region 911 on the display face 91 may be any value such as 80%, 90%, or 100%.

In an embodiment of the present disclosure, the orthographic projection of the plurality of photosensitive units 41 on the display face 91 is located within the display region 911, so that the plurality of photosensitive units 41 may image objects touching the display region 911. With a user's use of a finger to touch the display region 911 as an example, the plurality of photosensitive units 41 may image the fingerprint of the finger touching the display region 911 to make fingerprint identification. Further, since the photosensitive layer 40 is disposed on the first face 601, the photosensitive layer 40 is located above the light-shielding member 62. The light-shielding member 62 does not need to define light-through holes, thereby making it possible to simplify the manufacturing process of the display device 100.

With further reference to FIG. 9 and FIG. 10, specific details of imaging performed by the display device 100 according to the embodiments of the present disclosure will be described with examples below. The light signal La emitted by the display device 100 passes through the first polarization layer 20, the first substrate 30, the liquid crystal layer 50, the second substrate 60, the photosensitive layer 40, the collimation layer 70, the second polarization layer 80, and the cover plate 90 in turns, before entering the outside. A light signal from the outside may also pass through the cover plate 90, the second polarization layer 80, and the collimation layer 70 in turns, before reaching the photosensitive layer 40. If the light signal just reaches the photosensitive unit 41 in the photosensitive layer 40, the photosensitive unit 41 will generate an electrical signal to reflect intensity of the light signal. Therefore, intensity of the electrical signals of the plurality of photosensitive units 41 may reflect intensity distribution of the light signals entering the display device 100.

Take the user's touching the display face 91 with a finger 2000 as an example. When the display device 100 is emitting a light signal La outward, the finger 2000 touches a predetermined position of the display face 91. The finger 2000 may reflect the light signal La to form L1. The light signal L1 then starts to enter the display device 100. The light signal L1 first passes through the cover plate 90 and the second polarization layer 80. The light signal L1, whose propagation direction is the same as the extending direction of the light-passing hole 711, may also pass through the light-passing hole 711. After passing through the light-passing hole 711, the light signal L1 reaches the photosensitive unit 41. After a light signal, whose propagation direction is different from the extending direction of the light-passing hole 711, passes through the cover plate 90 and the second polarization layer 80, the light signal cannot pass through the light-passing hole 711, and thereby cannot reach the photosensitive unit 41 aligned with the light-passing hole 711.

It may be understood that, there are peaks and valleys in the fingerprint of a finger. When the finger 2000 touches the display face 91, the peaks directly contact the display face 91. There is a gap between the valleys and the display face 91. After the light signal La reaches the peaks and valleys, intensity of light signals (hereinafter referred to as first light signals) reflected by the peaks and intensity of light signals (hereinafter referred to as second light signals) reflected by the valleys differ, so that due to a difference between intensity of electrical signals (hereinafter referred to as first electrical signals) generated by receiving the first light signals and intensity of electrical signals (hereinafter referred to as second electrical signals) generated by receiving the second light signals, the imaging chip 300 may obtain an image of the fingerprint according to distribution conditions of the first electrical signals and the second electrical signals. The image of the fingerprint may be further configured to make fingerprint identification.

It may be understood that, the user may achieve the purpose of imaging and identifying the fingerprint by touching above any region where the photosensitive units 41 are provided. When the photosensitive units 41 are correspondingly provided below the display region 911, the user may achieve the purpose of imaging and identifying the fingerprint by touching any position in the display region 911, not limited to some particular positions of the display region 911. Meanwhile, the user may also simultaneously touch multiple positions on the display region 911 with multiple fingers, or multiple users may simultaneously touch multiple positions on the display region 911 with multiple fingers to achieve the purpose of imaging and identifying multiple fingerprints. As such, it is possible to enrich verification manners and applicable scenarios of the electronic apparatus 1000. For example, only when multiple fingerprints are simultaneously verified, multiple users may be authorized to perform operations such as games on the same electronic apparatus 1000.

Of course, similar to the case that the user touches the display face 91 with a finger, after any object (e.g., the user's arm, forehead, clothes, flowers, etc.) capable of reflecting the light signal La touches the display face 91, it is possible to image face texture of the object. Subsequent processing performed for the imaging can be set according to user's needs, without any limitation set herein.

Figure 14:
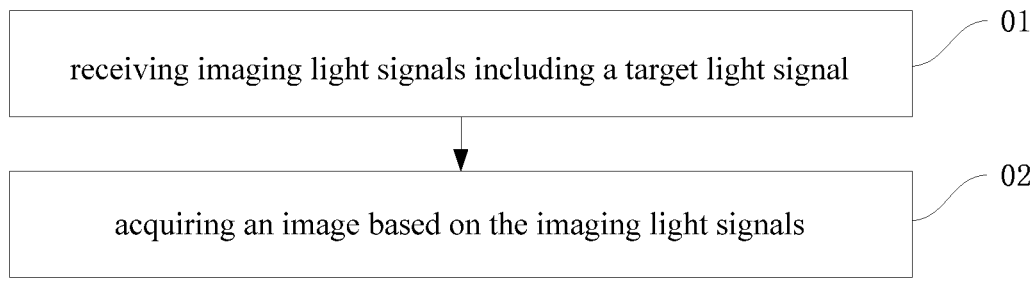
FIG. 14 is a flowchart of an image acquisition method according to an embodiment of the present disclosure.

In conjunction with FIG. 14, an embodiment of the present disclosure further discloses an image acquisition method, which may be applied to the display device 100 according to any one of the foregoing embodiments. The image acquisition method includes following operations. 01: receiving imaging light signals including a target light signal; and 02: acquiring an image based on the imaging light signals.

Operation 01 may be implemented by the photosensitive layer 40, and operation 02 may be implemented by the imaging chip 300. The imaging light signals refer to all the light signals received by the photosensitive units 41, and the target light signal refers to a light signal that, after passing through the light-passing hole 711 and the light-through hole 621, reaches the photosensitive unit 41, or the target light signal refers to a light signal that, after passing through the light passing hole 711, reaches the photosensitive unit 41. For specific implementation details of operations 01 and 02, reference may be made to the foregoing description of the display device 100, and details are omitted herein.

In summary, in the electronic apparatus 1000 and the image acquisition method according to the embodiments of the present disclosure, the plurality of photosensitive units 41, which are disposed on the second substrate 60 located between the display face 91 and the bottom face 11 of the display device 100, may receive light signals entering from the display face 91 and passing through the light-passing holes 711. In light of the light signals, it is possible to acquire images of objects touching the display face 91, which images may be used for fingerprint identification. Meanwhile, according to requirements, a distribution area of the plurality of photosensitive units 41 may be set to account for a larger proportion of the area of the display face 91, such that the user may make fingerprint identification in a larger area of the display face 91, thereby ensuring a better user experience.

Figure 15:
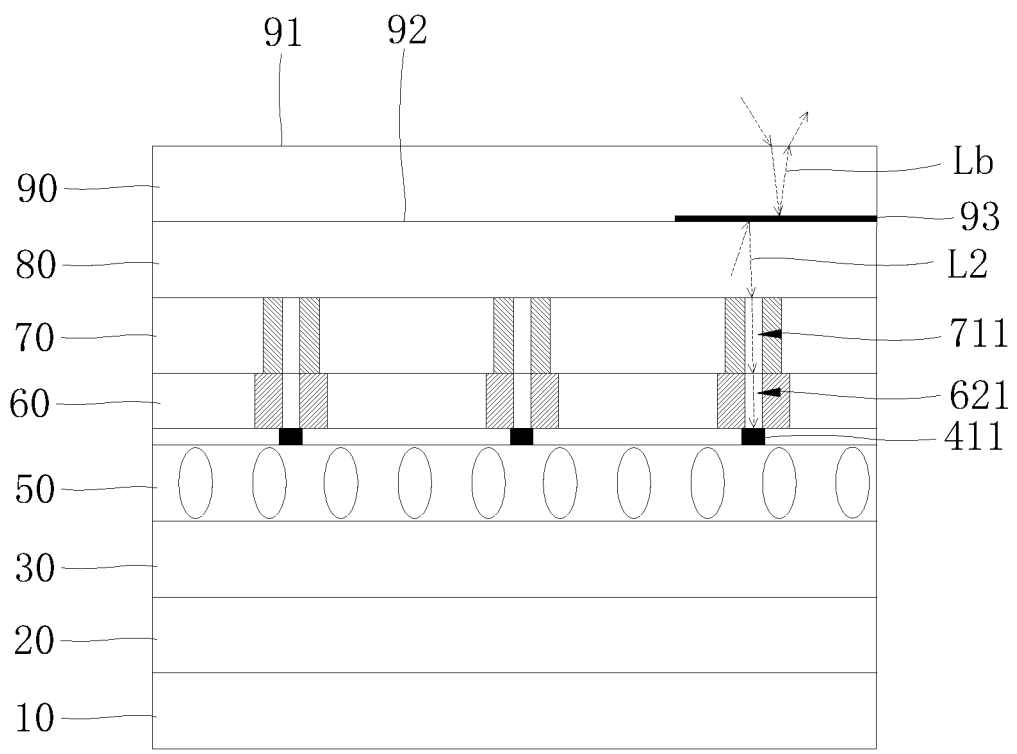
FIG. 15 is a side-view structural diagram of a display device when a photosensitive layer is disposed on a second face according to an embodiment of the present disclosure.
Figure 16:
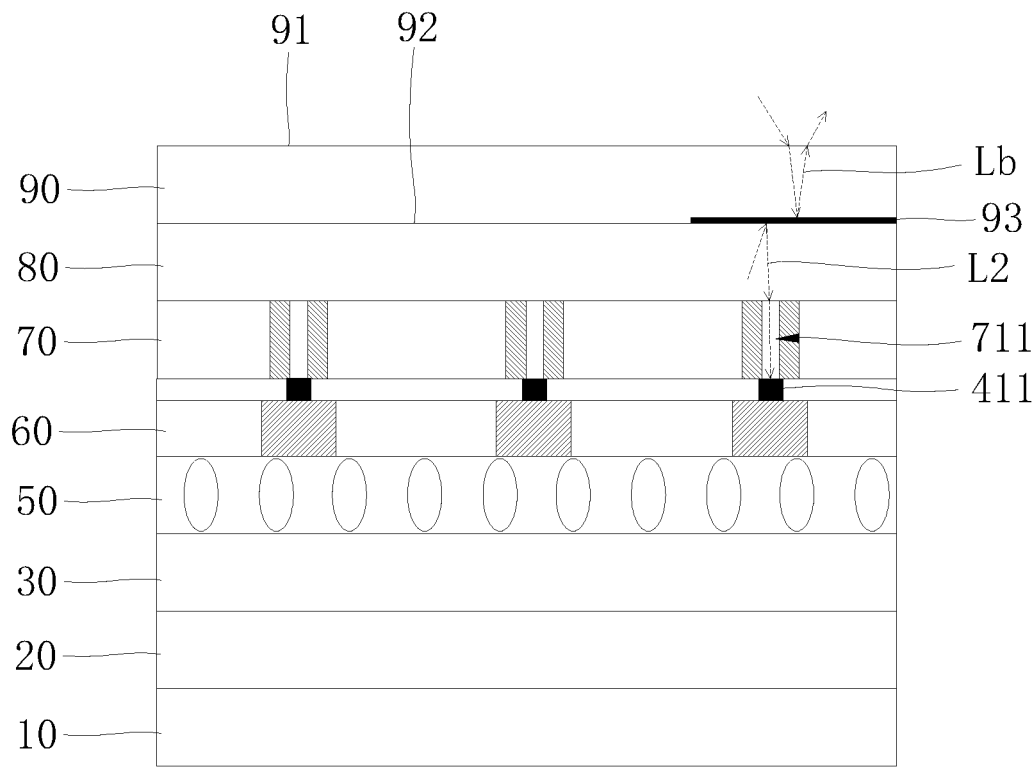
FIG. 16 is a side-view structural diagram of a display device when a photosensitive layer is disposed on a first face according to an embodiment of the present disclosure.

With reference to FIGS. 6, 15 and 16, in some embodiments, the photosensitive unit 41 include astray light photosensitive unit 411. An ink layer 93 is provided on the back face 92 of the cover plate 90. The position of the stray photosensitive unit 411 corresponds to the position of the ink layer 93, i.e., an orthographic projection of the stray light photosensitive unit 411 on the cover plate 90 is located within the ink layer 93. The ink layer 93 is configured to block a light signal Lb passing from the outside into the cover plate 90.

In actual use, part of light signals emitted from the backlight layer 10 directly passes through the display face 91, part of the light signals is reflected one or more times between the display face 91 and the backlight layer 10, and part of the reflected light signals L2 may reach the photosensitive unit 41 and cause interference with imaging of the photosensitive unit 41. That is, the imaging light signals used for the imaging further include an interference light signal L2, which is reflected by the display device 100 and reaches the photosensitive unit 41 on the photosensitive layer 40.

An ink layer 93 is provided at a position of the back face 92 corresponding to the stray light photosensitive unit 411. After light rays within the display device 100 reach the ink layer 93, most of the light rays are absorbed by the ink layer 93, and a small part thereof (for example, 4%) is reflected by the ink layer 93. The ink layer 93 may be configured to simulate the effect of the cover plate 90's reflection of the light signals inside the display device 100. The stray light photosensitive unit 411 may receive the same interference light signal L2 as the other photosensitive units 41. Meanwhile, the ink layer 93 may block (reflect or absorb) the light signal Lb passing from the outside into the cover plate 90, so that the stray light photosensitive unit 411 only receives the interference light signal L2, and the other photosensitive units 41 may simultaneously receive the interference light signal L2 and the light signal Lb passing from the outside into the cover plate 90.

The type and performance of the stray photosensitive unit 411 are the same as those of the other photosensitive units 41. The stray photosensitive unit 411 may transmit an interference electrical signal generated by the interference light signal L2 to the imaging chip 300. The imaging chip 300, at the time of imaging, will correct the image according to the interference electrical signal. For example, the imaging electrical signals generated by the imaging light signals are subtracted by the interference electrical signals, before serving as electrical signals finally used for the imaging to obtain a more accurate image and improve accuracy of image identification. In one example, the stray light photosensitive unit 411 and the other photosensitive units 41 are CCD image sensors. At this time, the subtraction of the interference electrical signals from the imaging electrical signals may be performed in the imaging chip 300. That is, the imaging electrical signals and the interference electrical signals all are transmitted to the imaging chip 300, and the imaging chip 300 performs the operation of subtracting the interference electrical signals from the imaging electrical signals. Alternatively, the subtraction of the interference electrical signals from the imaging electrical signals may also be performed in an analog-to-digital converter. That is, the imaging electrical signals and the interference electrical signals are first transmitted to the analog-to-digital converter, and the analog-to-digital converter performs the operation of subtracting the interference electrical signals from the imaging electrical signals, and then electrical signals obtained by the subtraction are transmitted to the imaging chip 300. In another example, the stray light photosensitive unit 411 and the other photosensitive units 41 are CMOS image sensors. At this time, the subtraction of the interference electrical signals from the imaging electrical signals may be performed in the imaging chip 300. That is, the imaging electrical signals and the interference electrical signals all are transmitted to the imaging chip 300, and the imaging chip 300 performs the operation of subtracting the interference electrical signals from the imaging electrical signals. Alternatively, the subtraction of the interference electrical signals from the imaging electrical signals may also be performed in the photosensitive unit 41. The photosensitive unit 41 is additionally provided with a first storage region, a second storage region, and a logic subtraction circuit. The imaging electrical signals generated by the photosensitive unit 41 are stored in the first storage region. The interference electrical signals are sent by the stray light photosensitive unit 411 to the photosensitive unit 41 and stored in the second storage region. The logic subtraction circuit performs an operation of subtracting the interference electrical signals from the imaging electrical signals, and then transmits electrical signals obtained by the subtraction to the imaging chip 300. The foregoing description of the subtraction of the interference electrical signals from the imaging electrical signals is merely examples, and shall not be understood as a limitation on the present disclosure.

In an example, the ink layer 93 is disposed at a position adjacent to an edge of the back face 92, and the stray light photosensitive unit 411 is located at an edge position of the photosensitive layer 40. For example, the stray light photosensitive unit 411 is provided within a region a as shown in FIG. 6, where the region a is located on a leftmost column and a rightmost column of the array of photosensitive units 41 in FIG. 6. The ink layer 93 is avoided from largely affecting the display effect of the display device 100. Specifically, the photosensitive units 41 may be arranged in a matrix of multiple rows and columns, and the stray light photosensitive unit 411 may be disposed at an edge position of the matrix, for example, column one to column three adjacent to the edge of the matrix and row one to row three adjacent to the edge of the matrix, to adapt to the position of the ink layer 93.

Further, since the stray photosensitive units 411 are plural, a plurality of interference electrical signals may be generated accordingly, and sizes of the plurality of interference electrical signals may be non-identical. Then, when the interference electrical signals are subtracted from the imaging electrical signals, it is possible in an example to average the plurality of interference electrical signals and then to subtract the interference electrical signal obtained after the averaging from the imaging electrical signals. In another example, it is possible to divide the photosensitive units 41 and the stray light photosensitive units 411 into regions, respectively, where each region includes at least one photosensitive unit 41 or at least one stray light photosensitive unit 411. Subsequently, it is possible to determine a second region closest to each first region according to a position of each region (hereinafter referred to as a first region) containing photosensitive units 411 and a position of each region (hereinafter referred to as a second region) containing stray light photosensitive units 411. As for each photosensitive unit 41 in each first region, it is possible to subtract the interference electrical signal, generated by the stray light photosensitive unit 411 in the second region closest to the first region, from the imaging electrical signal generated by each photosensitive unit 41 to obtain an electrical signal that each photosensitive unit 41 finally uses for imaging. If the number of stray light photosensitive units 411 in the second region is plural, it is possible to first average the plurality of interference electrical signals generated by the plurality of stray light photosensitive units 411 in the second region and then to subtract the average value from the imaging electrical signals to obtain an electrical signal finally used for the imaging. It may be understood that, the closer the stray light photosensitive units 411 to the photosensitive units 41, the more similar the number of interference light signals received by the stray light photosensitive units 411 to the number of interference light signals received by the photosensitive units 41, the more similar the generated interference electrical signals, and the more accurate the electrical signals used for imaging finally obtained after subtracting the interference electrical signals from the imaging electrical signals.

Figure 17:
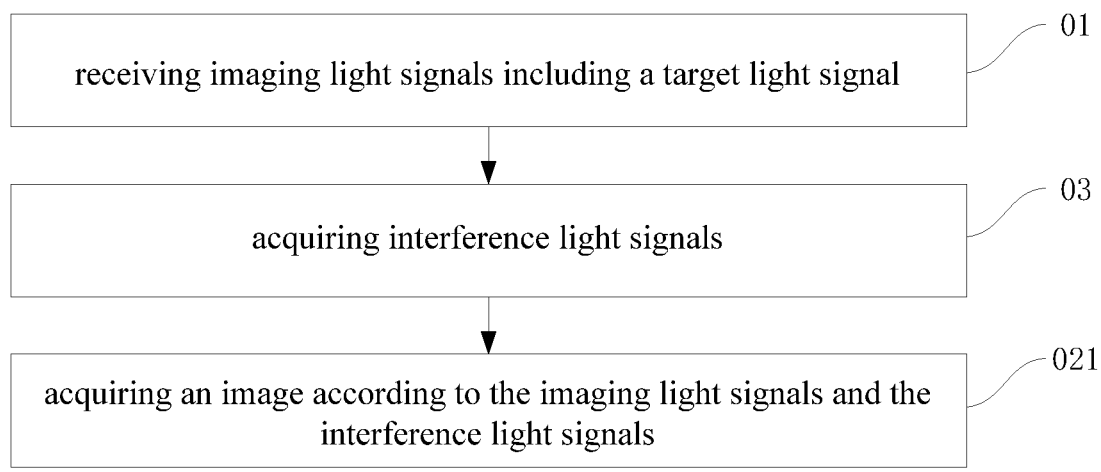
FIG. 17 is a flowchart of an image acquisition method according to an embodiment of the present disclosure.
Figure 18:
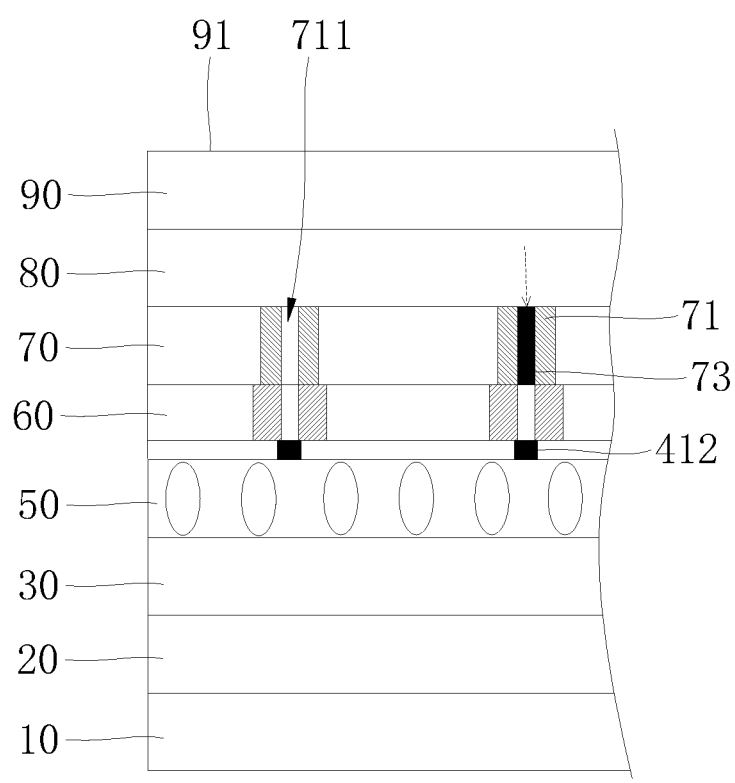
FIG. 18 is a side-view structural diagram of a display device when a photosensitive layer is disposed on a second face according to an embodiment of the present disclosure.

With reference to FIG. 17, in some embodiments, the image acquisition method further includes operation 03: acquiring interference light signals; operation 02 includes operation 021: acquiring an image according to the imaging light signals and the interference light signals.

Operation 03 may be implemented by the stray photosensitive units 411, and operation 021 may be implemented by the imaging chip 300. For details of implementing operation 03 and operation 021, reference may be made to the above description, and details are omitted herein.

Figure 19:
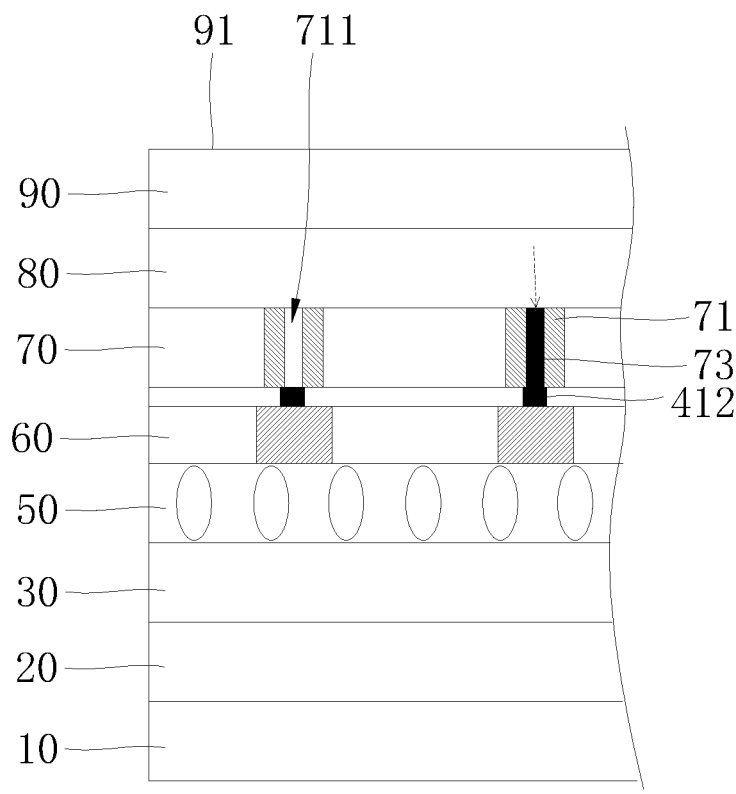
FIG. 19 is a side-view structural diagram of a display device when a photosensitive layer is disposed on a first face according to an embodiment of the present disclosure.

With reference to FIGS. 6, 8 and 19, in some embodiments, the photosensitive units 41 include noise photosensitive units 412, and the display device 100 further includes a light-shielding unit 73 disposed on the collimator 71 and configured to shield the light-passing hole 711 aligned with the noise photosensitive unit 412.

In use, the temperature of the photosensitive units 41 or the temperature of the environment changes, and performance of the photosensitive units 41 may vary with the temperature. For example, the photosensitive units 41 may be made of amorphous silicon (A-Si) material. When the temperature changes, background noises generated by the photosensitive units 41 may also change. Therefore, when imaging is performed, it is necessary to correct interference caused by the temperature change.

In this embodiment, the type and performance of the noise photosensitive units 412 are the same as those of the other photosensitive units 41, and the light-shielding unit 73 blocks the light-passing holes 711, so that the noise photosensitive units 412 can hardly receive light signals. The noise photosensitive units 412 may generate electrical signals during use, but since the noise photosensitive units 412 can hardly receive the light signals, the electrical signals generated by the noise photosensitive units 412 may be regarded as noise electrical signals generated due to changes in the material and temperature. At this time, in addition to receiving the imaging light signals to generate imaging electrical signals, the other photosensitive units 41 also concurrently generate noise electrical signals. The noise electrical signals generated by the photosensitive units 41 are substantially the same as the noise electrical signals generated by the noise photosensitive units 412. Then, the noise photosensitive units 412 transmit the noise electrical signals to the imaging chip 300, and the imaging chip 300, at the time of imaging, will correct the image according to the noise electrical signals. For example, the imaging electrical signals generated by the imaging light signals are subtracted by the interference electrical signals, before serving as electrical signals finally used for the imaging to obtain a more accurate image and improve accuracy of image identification. Similar to the case that the photosensitive units 41 include stray light photosensitive units 411, the operation of subtracting the noise electrical signals from the imaging electrical signals may also be performed in other means than the imaging chip 300, and details are omitted herein.

Specifically, the light-shielding unit 73 may also be made of light absorbing material. The light-shielding unit 73 may be filled within the light-passing hole 711. The light-shielding unit 73 and the collimator 71 may be manufactured together. In one example, the light-shielding unit 73 may also be directly disposed on the noise photosensitive units 412, so that the noise photosensitive units 412 cannot receive the light signals at all. The noise photosensitive units 412 may be disposed in a region near the edge of the array of the photosensitive units 41. The noise photosensitive units 412 may also be disposed in a region adjacent to the stray photosensitive units 411, for example, may be located in column one to column three within the matrix, or row one to row three within the matrix, without any limitation set herein. The noise photosensitive units 412 are provided within a region b shown in FIG. 6, where the region b is located on the second column from the left and the second column from the right of the array of photosensitive units 41 in FIG. 6.

Further, since the noise photosensitive units 412 are plural, a plurality of noise electrical signals will be generated accordingly, and sizes of the plurality of noise electrical signals may be non-identical. Then, when the noise electrical signals are subtracted from the imaging electrical signals, it is possible in an example to average the plurality of noise electrical signals and then to subtract the noise electrical signals obtained after the averaging from the imaging electrical signals. In another example, it is possible to divide the photosensitive units 41 and the noise photosensitive units 412 respectively into regions, where each region includes at least one photosensitive unit 41 or at least one noise photosensitive unit 412. Subsequently, it is possible to determine a third region closest to each first region according to a position of each region (hereinafter referred to as a first region) containing photosensitive units 411 and a position of each region (hereinafter referred to as a third region) containing noise photosensitive units 412. As for each photosensitive unit 41 in each first region, it is possible to subtract the noise electrical signal, generated by the noise photosensitive unit 412 in the third region closest to the first region, from the imaging electrical signal generated by each photosensitive unit 41 to obtain an electrical signal that each photosensitive unit 41 finally uses for imaging. If the number of noise photosensitive units 412 in the third region is plural, it is possible to first average the plurality of noise electrical signals generated by the plurality of noise photosensitive units 412 in the third region and then to subtract the average value from the imaging electrical signals to obtain electrical signals finally used for imaging. It may be understood that, the closer the noise photosensitive units 412 to the photosensitive units 41, the more similar the temperature of the noise photosensitive units 412 to the temperature of the photosensitive units 41, the more similar the generated noise electrical signals, and the more accurate the electrical signals used for imaging finally obtained after subtracting the noise electrical signals from the imaging electrical signals.

Figure 20:
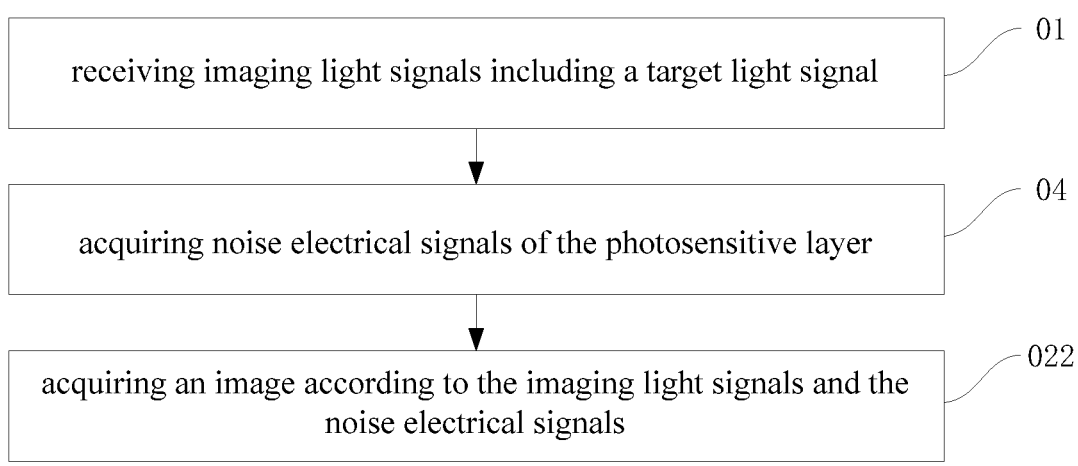
FIG. 20 is a flowchart of an image acquisition method according to an embodiment of the present disclosure.

With reference to FIG. 20, in some embodiments, the image acquisition method further includes operation 04: acquiring noise electrical signals of the photosensitive layer 40; operation 02 includes operation 022: acquiring an image according to the imaging light signals and the noise electrical signals.

Operation 04 may be implemented by the noise photosensitive units 412, and operation 022 may be implemented by the imaging chip 300. For details of implementing operation 04 and operation 022, reference may be made to the above description, and details are omitted herein.

With reference to FIG. 6, in some embodiments, the circuit units 42 include a photosensitive circuit unit 421 and a noise circuit unit 422. The photosensitive circuit unit 421 is connected to the photosensitive unit 41. The noise circuit unit 422 is not connected to the photosensitive units 41.

The circuit units 42 per se have hardware noises, which are caused by such factors as interference and switching load changes. The hardware noises may result in circuit noise signals which will affect intensity of electrical signals finally transmitted to the imaging chip 300. Therefore, when imaging is performed, it is necessary to correct interference caused by the circuit noise signals.

In this embodiment, the noise circuit units 422 are not connected to the photosensitive units 41, and the circuit noise signals generated by the noise circuit units 422 are all hardware noises from the noise circuit units 422 per se. The noise circuit units 422 transmit the circuit noise signals to the imaging chip 300. The imaging chip 300, at the time of imaging, will correct the image according to the circuit noise signals. For example, the imaging electrical signals generated by the imaging light signals are subtracted by the interference electrical signals, before serving as electrical signals finally used for the imaging to obtain a more accurate image and improve accuracy of image identification.

Specifically, the plurality of circuit units 42 may be arranged in an array of multiple rows and columns. The noise circuit units 422 are arranged at least in a complete row and a complete column, so that the noise circuit units 422 are distributed in any row and any column. Samples of the circuit noise signals generated by the noise circuit units 422 are more comprehensive. When the image is corrected according to the circuit noise signals, the correction result will be better. The noise circuit units 422 may also be disposed at an edge position of an array in which the plurality of circuit units 42 are arranged, or may be disposed adjacent to the above-mentioned stray light photosensitive units 411 and noise photosensitive units 412. The distribution range of the noise circuit units 422 may cover complete column one to column five and complete row one to row five, without any limitation set herein. In the example shown in FIG. 6, the noise circuit units 422 are provided within a region c of the photosensitive layer 40, where the region c is located on the third column from the left, the third column from the right, the uppermost row and the lowermost row in the array of circuit units 42 in FIG. 6.

Further, since the noise photosensitive units 412 are plural, a plurality of circuit noise signals will be generated accordingly, and sizes of the plurality of circuit noise signals may be non-identical. Then, when the circuit noise signals are subtracted from the imaging electrical signals, it is possible in an example to average the plurality of circuit noise signals and then to subtract circuit noise signals obtained after the averaging from the imaging electrical signals. In another example, it is possible to divide the photosensitive units 41 and the noise circuit units 422 respectively into regions, where each region includes at least one photosensitive unit 41 or at least one noise circuit unit 422. Subsequently, it is possible to determine a fourth region closest to each first region according to a position of each region (hereinafter referred to as a first region) containing photosensitive units 411 and a position of each region (hereinafter referred to as a fourth region) containing noise circuit units 422. As for each photosensitive unit 41 in each first region, it is possible to subtract the noise electrical signal, generated by the noise circuit unit 422 in the fourth region closest to the first region, from the imaging electrical signal generated by each photosensitive unit 41 to obtain an electrical signal that each photosensitive unit 41 finally uses for imaging. If the number of noise circuit units 422 in the fourth region is plural, it is possible to first average the plurality of noise electrical signals generated by the plurality of noise circuit units 422 in the fourth region and then to subtract the average value from the imaging electrical signals to obtain electrical signals finally used for imaging.

Figure 21:
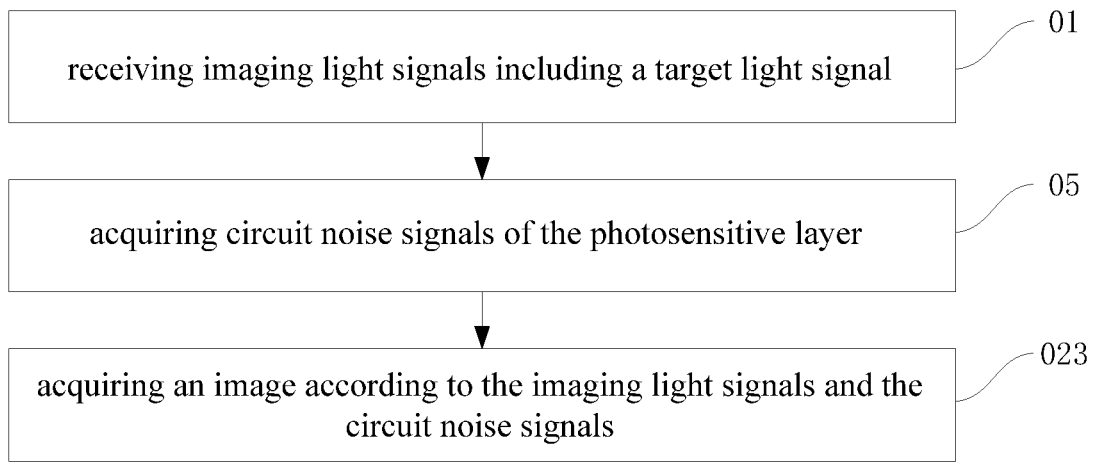
FIG. 21 is a flowchart of an image acquisition method according to an embodiment of the present disclosure.

In conjunction with FIG. 21, in some embodiments, the image acquisition method further includes operation 05: acquiring circuit noise signals of the photosensitive layer 40; and operation 02 includes operation 023: acquiring an image according to the imaging light signals and the circuit noise signals.

Operation 05 may be implemented by the noise circuit units 422, and operation 023 may be implemented by the imaging chip 300. For details of implementing operation 05 and operation 023, reference may be made to the above description, and details are omitted herein.

With reference to FIG. 6, in some embodiments, the photosensitive units 41 further include a plurality of infrared photosensitive units 413 configured to detect infrared light.

Due to the presence of infrared light in external environment, the infrared light may penetrate certain objects to enter the display device 100. For example, the infrared light may penetrate the user's finger, pass through the display face 91 and the light-passing hole 711, and be received by the photosensitive units 41. This part of infrared light is not associated with the user's fingerprint. Infrared electrical signals generated by the part of infrared light (infrared light signals) may cause interference when the imaging chip 300 performs imaging. Therefore, when imaging is performed, it is necessary to correct interference caused by the infrared light signals.

The infrared photosensitive units 413 may only receive infrared light signals and generate infrared electrical signals according to the infrared light signals. The infrared photosensitive unit 413 may be made of germanium material, so that the infrared photosensitive units 413 only receive the infrared light signals. The other photosensitive units 41 may simultaneously receive infrared light signals and visible light signals, and generate imaging electrical signals according to the infrared light signals and visible light signals. The infrared electrical signals are further transmitted to the imaging chip 300. The imaging chip 300, at the time of imaging, will correct the image according to the infrared electrical signals. For example, the imaging electrical signals generated by the imaging light signals are subtracted by the infrared electrical signals, before serving as electrical signals finally used for the imaging to obtain a more accurate image and improve accuracy of image identification. Similar to the case that the photosensitive units 41 include stray light photosensitive units 411, the operation of subtracting the infrared electrical signals from the imaging electrical signals may also be performed in other means than the imaging chip 300, and details are omitted herein.

Specifically, the plurality of infrared photosensitive units 413 may be distributed at intervals, for example, uniformly distributed within the array of photosensitive units 41. A proportion of the infrared photosensitive units 413 in the photosensitive units 41 may be smaller, such as 1%, 7%, 10% or the like. In conjunction with FIG. 3, when the user touches the display face 91, the display device 100 may sense the touched position, and the imaging chip 300 reads infrared electrical signals generated by one or more infrared photosensitive units 413 corresponding to the touched position, and corrects the image according to the infrared electrical signals.

Figure 22:
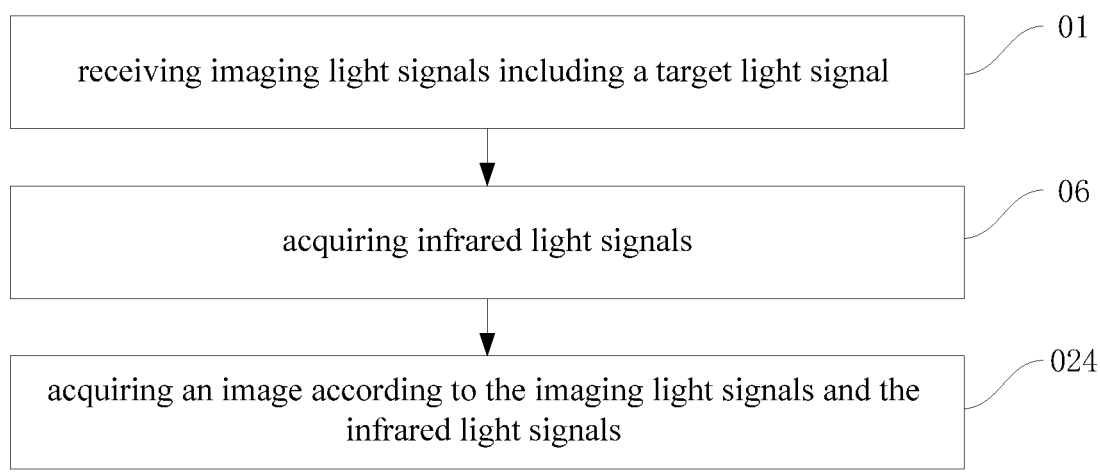
FIG. 22 is a flowchart of an image acquisition method according to an embodiment of the present disclosure.

In conjunction with FIG. 22, in some embodiments, the image acquisition method further includes operation 06: acquiring infrared light signals; and operation 02 includes operation 024: acquiring an image according to the imaging light signals and the infrared light signals.

Operation 06 may be implemented by the infrared photosensitive units 413, and operation 024 may be implemented by the imaging chip 300. For details of implementing operation 06 and operation 024, reference may be made to the above description, and details are omitted herein.

Further, since the infrared photosensitive units 413 are plural, a plurality of infrared electrical signals will be generated accordingly, and sizes of the plurality of infrared electrical signals may be non-identical. Then, when the infrared electrical signals are subtracted from the imaging electrical signals, it is possible in an example to average the plurality of infrared electrical signals and then to subtract infrared electrical signals obtained after the averaging from the imaging electrical signals. In another example, it is possible to divide the photosensitive units 41 and the infrared photosensitive units 413 respectively into regions, where each region includes at least one photosensitive unit 41 or at least one infrared photosensitive unit 413. Subsequently, it is possible to determine a fifth region closest to each first region according to a position of each region (hereinafter referred to as a first region) containing photosensitive units 411 and a position of each region (hereinafter referred to as a fifth region) containing infrared photosensitive units 413. As for each photosensitive unit 41 in each first region, it is possible to subtract the infrared electrical signal, generated by the infrared photosensitive unit 413 in the fifth region closest to the first region, from the imaging electrical signal generated by each photosensitive unit 41 to obtain an electrical signal that each photosensitive unit 41 finally uses for imaging. If the number of infrared photosensitive units 413 in the fifth region is plural, it is possible to first average the plurality of infrared electrical signals generated by the plurality of infrared photosensitive units 413 in the fifth region and then to subtract the average value from the imaging electrical signals to obtain electrical signals finally used for imaging. It may be understood that, the closer the infrared photosensitive units 413 to the photosensitive units 41, the more similar the amount of infrared light received by the infrared photosensitive units 413 to the amount of infrared light received by the photosensitive units 41, the more similar the generated infrared electrical signals, and the more accurate the electrical signals for imaging finally obtained after subtracting the infrared electrical signals from the imaging electrical signals.

In addition, in some embodiments, it is also possible to dispose an infrared cut-off film between the photosensitive layer 40 and the display face 91, without disposing the infrared photosensitive units 413. The infrared cut-off film has a relatively high transmittance of visible light, which can reach 90% or more, and has a relatively low transmittance of infrared light signals to prevent external infrared light signals from reaching the photosensitive units 41.

Any one or more of the stray light photosensitive units 411, the noise photosensitive units 412, the noise circuit units 422, and the infrared photosensitive units 413 may be provided simultaneously on the same photosensitive layer 40. For example, the stray photosensitive units 411 and the noise photosensitive units 412 are provided simultaneously. At this time, the imaging chip 300, at the time of imaging, will correct the image according to the interference electrical signals and the noise electrical signals. For example, the imaging electrical signals generated by the imaging light signals are subtracted by the interference electrical signals and noise electrical signals, before serving as electrical signals finally used for the imaging. For another example, the stray light photosensitive units 411 and the noise circuit units 422 are provided simultaneously. At this time, the imaging chip 300, at the time of imaging, will correct the image according to the interference electrical signals and the circuit noise signals. For example, the imaging electrical signals generated by the imaging light signals are subtracted by the interference electrical signals and the circuit noise signals, before serving as electrical signals finally used for the imaging. For another example, the noise circuit units 422 and the infrared photosensitive units 413 are provided simultaneously. At this time, the imaging chip 300, at the time of imaging, will correct the image according to the circuit noise signals and the infrared electrical signals. For example, the imaging electrical signals generated by the imaging light signals are subtracted by the circuit noise signals and the infrared electrical signals, before serving as electrical signals finally used for the imaging. For another example, the noise photosensitive units 412, the noise circuit units 422, and the infrared photosensitive units 413 are provided simultaneously. At this time, the imaging chip 300, at the time of imaging, will correct the image according to the noise electrical signals, the circuit noise signals, and the infrared electrical signals. For example, the imaging electrical signals generated by the imaging light signals are subtracted by the noise electrical signals, the circuit noise signals and the infrared electrical signals, before serving as electrical signals finally used for the imaging. For another example, the stray photosensitive units 411, the noise photosensitive units 412, and the infrared photosensitive units 413 are provided simultaneously. At this time, the imaging chip 300, at the time of imaging, will correct the image according to the interference electrical signals, the noise electrical signals, the circuit noise signals, and the infrared electrical signals. For example, the imaging electrical signals generated by the imaging light signals are subtracted by the interference electrical signals, the noise electrical signals, the circuit noise signals and the infrared electrical signals, before serving as electrical signals finally used for the imaging.

Reference throughout this specification to terms of "some embodiments," "an embodiment," "example embodiment," "an example," "a specific example," or "some examples," means that a particular feature, structure, material, or characteristic described in connection with the embodiment or example is included in at least one embodiment or example of the present disclosure. In this specification, the schematic expressions of the above terms do not necessarily refer to the same embodiment or example. Furthermore, the particular features, structures, materials, or characteristics may be combined in any suitable manner in one or more embodiments or examples.

In addition, the terms of "first" and "second" are used for descriptive purposes only, and cannot be understood as indicating or implying relative importance or implicitly indicating the number of technical features indicated. Therefore, features defined as "first" and "second" may explicitly or implicitly include at least one of the features. In the description of the present disclosure, the meaning of "a plurality of" is at least two, for example, two, three, unless specifically defined otherwise.

Although embodiments of the present disclosure have been shown and described above, it can be understood that the above embodiments are examples and should not be construed as limitations on the present disclosure. Those skilled in the art can make changes, modifications, replacements, and variations to the above embodiments within the scope of the present disclosure. The scope of the present disclosure is defined by the claims and their equivalents.

What is claimed is:

1. A display device, comprising a display face and a bottom face facing away from each other, wherein between the display face and the bottom face, the display device further comprises:
    a substrate;
    a photosensitive layer comprising a plurality of photosensitive units, the plurality of photosensitive units being disposed on the substrate; and
    a plurality of collimators disposed between the photosensitive layer and the display face, the collimators defining light-passing holes aligned with the photosensitive units, wherein the light-passing holes are capable of allowing light signals to pass through to reach the photsensitive units, wherein the photosensitive layer furhter comprises a pluralit of circuit units, the circuit units comprising photosensitive circuit units and noise circuit units, each of the photosensitive units being connected to a corresponding one of the photosensitive circuit units, the noise circuit unit being not connected to the photosensitive unit.

2. The display device according to claim 1, wherein the display device comprises another substrate, a liquid crystal layer, and the substrate that are sequentially stacked, the substrate comprising a first face facing the display face and a second face facing away from the first face, the plurality of photosensitive units being disposed on the second face, the first face being provided with a plurality of display units and a light-shielding member located between the plurality of display units, the light-shielding member defining light-through holes aligned with the light-passing holes and the photosensitive units.

3. The display device according to claim 1, wherein the display device comprises another substrate, a liquid crystal layer, and the substrate that are sequentially stacked, the substrate comprising a first face facing the display face and a second face facing away from the first face, the plurality of photosensitive units being disposed on the first face, the second face being provided with a plurality of display units and a light-shielding member located between the plurality of display units.

4. The display device according to claim 2, wherein the light-shielding member is located between the collimator and the photosensitive unit, an orthographic projection of the plurality of collimators on the substrate being located within the light-shielding member.

5. The display device according to claim 4, wherein the photosensitive unit is located between the collimator and the light-shielding member, an orthographic projection of the plurality of collimators on the substrate being located within the light-shielding member.

6. The display device according to claim 1, wherein the display face defines a display region, and an orthographic projection of the plurality of photosensitive units on the display face is located within the display region.

7. The display device according to claim 1, wherein a ratio of a cross-sectional width of the light-passing holes to a depth of the light-passing holes is smaller than 0.2.

8. The display device according to claim 1, wherein a side of the plurality of photosensitive units facing the bottom face is provided with reflective material.

9. The display device according to claim 1, wherein the photosensitive units comprise a stray light photosensitive unit, the display device further comprising a cover plate on which the display face is formed, the cover plate further comprising a back face facing away from the display face, the back face being provided with an ink layer, an orthographic projection of the stray light photosensitive unit on the cover plate being located within the ink layer, the ink layer being configured to block light signals passing from outside into the cover plate.

10. The display device according to claim 9, wherein the ink layer is provided at a position adjacent to an edge of the back face, and the stray light photosensitive unit is located at an edge position of the photosensitive layer.

11. The display device according to claim 1, wherein the photosensitive unit comprises a noise photosensitive unit, and the display device further comprises a light-shielding unit disposed on the collimator and configured to shield the light-passing hole aligned with the noise photosensitive unit.

12. The display device according to claim 1, wherein the plurality of circuit units are arranged in an array of multiple rows and columns, and the noise circuit units are arranged at least in a complete row and a complete column.

13. The display device according to claim 1, wherein the photosensitive units further comprise a plurality of infrared photosensitive units configured to detect infrared light.

14. An electronic apparatus, comprising:
a casing; and
a display device, the display device is mounted on the casing;

wherein the display device comprises a display face and a bottom face facing away from each other, and wherein between the display face and the bottom face, the display device further comprises:
a photosensitive layer comprising a plurality of photosensitive units, the plurality of photosensitive units being disposed on a substrate; and
a plurality of collimators disposed between the photosensitive layer and the display face, the collimators defining light-passing holes aligned wih the photosensitive units, wherein the light-passing holes are capable of allowing light signals to pass through to reach to the photosensitive units, wherein the photosensitive layer further comprises a plurality of circuit units, the circuit unit comprising photosensitive circuit units and noise circuit units, each of the photosensitive units being connected to a corresponding one of the photosensitive circuit units, the noise circuit unit being not connected to the photosensitive unit.

15. The electronic apparatus according to claim 14, wherein the display device comprises another substrate, a liquid crystal layer, and the substrate that are sequentially stacked, the substrate comprising a first face facing the display face and a second face facing away from the first face, the plurality of photosensitive units being disposed on the second face, the first face being provided with a plurality of display units and a light-shielding member located between the plurality of display units, the light-shielding member defining light-through holes aligned with the light-passing holes and aligned with the photosensitive units.

16. The electronic apparatus according to claim 14, wherein the display device comprises another substrate, a liquid crystal layer, and the substrate that are sequentially stacked, the substrate comprising a first face facing the display face and a second face facing away from the first face, the plurality of photosensitive units being disposed on the first face, the second face being provided with a plurality of display units and a light-shielding member located between the plurality of display units.

17. An image acquisition method for a display device, the display device comprising a display face and a bottom face facing away from each other, wherein between the display face and the bottom face, the display device further comprises a photosensitive layer disposed on a substrate, and a collimator defining light-passing holes; and wherein the image acquisition method comprises: receiving imaging light signals comprising a target light signal, wherein the target light signal sequentially passes through the display face, the light-passing holes, and reaches the photosensistive layer; and acquiring an image according to the imaging light signals; wherein the imaging light signals refer to all the light signals received by the photosensitive layer, and the target light signal refers to a light signal that, after passing through the light-passing hole, reaches the photosensitive layer, wherein the image acquisition method further comprises: acquiring interference light signals; and acquiring an image according to the imaging light signals and the interference light signals; or wherein the image acquisition method further comprises: acquiring noise electrical signals of the photosensitive layer; and acquiring an image according to the imaging light signals and the noise electrical signals; or wherein the image acquistion method further comprises: acquiring circuit noise signals of the photosensitive layer; and acquiring an image according to the imaging light signals and the circuit noise signals; or wherein the image acquistion method further comprises: acquiring infrared light signals; and acquiring an image according to the imaging light signals and the infrared light singals.

\* \* \* \* \*